(12) United States Patent
Shibata

(10) Patent No.: US 10,408,164 B2
(45) Date of Patent: Sep. 10, 2019

(54) WASTE HEAT RECOVERY DEVICE, HEAT SUPPLY SYSTEM, AND OPERATION METHOD FOR WASTE HEAT RECOVERY DEVICE

(71) Applicant: Osaka Gas Co., Ltd., Osaka-shi (JP)

(72) Inventor: Yoshitaka Shibata, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 87 days.

(21) Appl. No.: 15/544,392

(22) PCT Filed: Nov. 20, 2015

(86) PCT No.: PCT/JP2015/082722
§ 371 (c)(1),
(2) Date: Jul. 18, 2017

(87) PCT Pub. No.: WO2016/117221
PCT Pub. Date: Jul. 28, 2016

(65) Prior Publication Data
US 2017/0370324 A1    Dec. 28, 2017

(30) Foreign Application Priority Data

Jan. 20, 2015 (JP) ................................. 2015-008803
Jul. 6, 2015 (JP) ................................. 2015-135514

(51) Int. Cl.
*F02G 5/04* (2006.01)
*F24D 17/00* (2006.01)
(Continued)

(52) U.S. Cl.
CPC ................. *F02G 5/04* (2013.01); *F02G 5/00* (2013.01); *F24D 3/08* (2013.01); *F24D 17/0005* (2013.01);
(Continued)

(58) Field of Classification Search
CPC ........ F02G 5/04; F24D 17/0005; F24H 1/206; F24H 1/22
See application file for complete search history.

(56) References Cited

U.S. PATENT DOCUMENTS 3,247,832 A * 4/1966 Kelley .................... F22B 35/00
                                                     122/451 R
3,672,442 A * 6/1972 Singh ........................ F24F 5/00
                                                     165/221
(Continued)

FOREIGN PATENT DOCUMENTS

JP    2012207928 A    10/2012
JP    2013104596 A     5/2013
(Continued)

OTHER PUBLICATIONS

English Translation JP 2014009834 A.*
(Continued)

*Primary Examiner* — Mark A Laurenzi
*Assistant Examiner* — Shafiq Mian
(74) *Attorney, Agent, or Firm* — The Webb Law Firm

(57) ABSTRACT

A waste heat recovery device with a first heat medium side inlet; a first heat medium side outlet; a first heat medium flow path; a second heat medium side inlet; a second heat medium side outlet; a second heat medium flow path; a heat exchanger that exchanges heat between the first heat medium and second heat medium; an expansion tank in the first heat medium flow path; a bypass flow path that causes the first heat medium to flow and bypass the heat exchanger; and a mixer where the bypass flow path and first heat medium flow path merge together. The mixer is configured to adjust a ratio of a flow rate of the first heat medium in the bypass flow path and a flow rate of the first heat medium in the heat exchanger, such that the temperature of the first heat
(Continued)

medium after merging approaches a predetermined temperature.

13 Claims, 7 Drawing Sheets

(51) Int. Cl.
    *F24H 1/22*     (2006.01)
    *F02G 5/00*     (2006.01)
    *F24D 3/08*     (2006.01)
    *F24H 1/20*     (2006.01)

(52) U.S. Cl.
    CPC ........... *F24H 1/22* (2013.01); *F24D 2200/04* (2013.01); *F24D 2200/26* (2013.01); *F24D 2220/0207* (2013.01); *F24D 2220/08* (2013.01); *F24H 1/206* (2013.01); *Y02B 10/70* (2013.01); *Y02B 30/18* (2013.01); *Y02E 20/14* (2013.01); *Y02T 10/166* (2013.01)

(56) References Cited

U.S. PATENT DOCUMENTS

| | | | | |
|---|---|---|---|---|
| 4,715,192 A | * | 12/1987 | Katz | F02G 5/02 237/12.1 |
| 5,007,583 A | | 4/1991 | Schwarz | |
| 5,441,103 A | * | 8/1995 | Rezkallah | F24F 12/002 165/104.29 |
| 5,727,393 A | * | 3/1998 | Mahmoudzadeh | F25D 17/02 62/156 |
| 10,087,896 B1 | * | 10/2018 | Perez | F04B 15/08 |
| 2003/0029169 A1 | * | 2/2003 | Hanna | F01K 17/02 60/651 |
| 2003/0074901 A1 | * | 4/2003 | Bellac | F01K 21/047 60/772 |
| 2004/0107700 A1 | * | 6/2004 | McClanahan | F01K 25/08 60/670 |
| 2005/0167169 A1 | * | 8/2005 | Gering | B60H 1/00278 237/12.3 B |
| 2006/0123823 A1 | * | 6/2006 | Ha | F02G 5/00 62/238.7 |
| 2008/0006040 A1 | * | 1/2008 | Peterson | B60H 1/3204 62/116 |
| 2011/0203303 A1 | | 8/2011 | Moure | |

FOREIGN PATENT DOCUMENTS

| | | |
|---|---|---|
| JP | 20149834 A | 1/2014 |
| JP | 201462677 A | 4/2014 |
| JP | 201495489 A | 5/2014 |
| WO | 8808943 A1 | 11/1988 |

OTHER PUBLICATIONS

English Translation JP 2014095489 A.*
English Translation JP 2012207928 A.*
English Translation JP 2014062677 A.*

* cited by examiner

WASTE HEAT RECOVERY DEVICE, HEAT SUPPLY SYSTEM, AND OPERATION METHOD FOR WASTE HEAT RECOVERY DEVICE

CROSS-REFERENCE TO RELATED APPLICATIONS

This application is the United States national phase of International Application No. PCT/JP2015/082722 filed Nov. 20, 2015, and claims priority to Japanese Patent Application Nos. 2015-008803 and 2015-135514, filed Jan. 20, 2015 and Jul. 6, 2015, respectively, the disclosures of which are hereby incorporated in their entirety by reference.

TECHNICAL FIELD

The present invention relates to a waste heat recovery device that recovers heat of a first heat medium and transfers that heat to a second heat medium, a heat supply system provided with the waste heat recovery device, and an operation method for the waste heat recovery device.

BACKGROUND ART

Conventionally, there are heat supply systems that allow heat generated by a heat source device to be used for hot water supply or indoor heating. For example, in a heat supply system described in Patent Document 1 (JP 2013-104596A), warm water in which heat generated by heat source devices, namely a heat pump (2) and an external heat source (3), has been recovered is supplied to a hot water storage tank (4) and an indoor heating device (5), while flowing through a water circuit (25) and warm water circuits (30A and 30B). When this heat supply system is installed in a building such as a house, it is also necessary to install the water circuit (25) and the warm water circuits (30A and 30B) indoors. Therefore, such a heat supply system is usually installed together with building construction.

PRIOR ART DOCUMENTS

Patent Documents

Patent Document 1: JP 2013-104596A

DISCLOSURE OF THE INVENTION

Problem to be Solved by the Invention

When attempting to add a newest heat source device, for example such as a heat pump, a solar water heater, or a combined heat and power supply device (such as a fuel cell), in a building where a heat supply system including a heat source device is already installed, it is preferable to perform a minimal amount of remodeling, without greatly remodeling equipment (for example, such as piping, valves, pumps, and the like) of the existing heat supply system.

Also, considering that the additional heat source device as described above has a configuration provided with a heat source unit that generates heat, and a heat exchanging unit for transferring the heat generated by the heat source unit to the existing heat medium flow path, the additional heat source device is usually installed outdoors, because a large installation space is required, the additional heat source device produces noise, and ventilation is necessary. However, when the additional heat source device is installed outdoors, waterproofing measures must be adopted, so there is a problem that the device becomes expensive. Also, when the additional heat source device is installed outdoors, there is a problem that measures must be adopted to avoid freezing in winter.

The present invention has been made in view of the above problems, and it is an object thereof to provide a waste heat recovery device capable of transferring heat recovered from a heat source device to existing equipment installed inside of a building, a heat supply system provided with this waste heat recovery device, and an operation method for the waste heat recovery device.

Means for Solving Problem

In a characteristic configuration of a waste heat recovery device according to the present invention for attaining the above object, in a waste heat recovery device that recovers heat of a first heat medium and transfers that heat to a second heat medium, the waste heat recovery device includes:

a first heat medium side inlet where the first heat medium flows in;

a first heat medium side outlet where the first heat medium flows out;

a first heat medium flow path where the first heat medium flows from the first heat medium side inlet to the first heat medium side outlet;

a first pump provided in the first heat medium flow path and causing the first heat medium to flow in the first heat medium flow path;

a second heat medium side inlet where the second heat medium flows in;

a second heat medium side outlet where the second heat medium flows out;

a second heat medium flow path where the second heat medium flows from the second heat medium side inlet to the second heat medium side outlet;

a heat exchanger that exchanges heat between the first heat medium that flows through the first heat medium flow path and the second heat medium that flows through the second heat medium flow path;

an expansion tank provided in the first heat medium flow path;

a bypass flow path that causes the first heat medium to flow so as to bypass the heat exchanger in the first heat medium flow path; and a mixer provided at a location where the bypass flow path and the first heat medium flow path merge together, the mixer configured to adjust a ratio of a flow rate of the first heat medium that flows through the bypass flow path and a flow rate of the first heat medium that flows through the heat exchanger, thereby mixing them such that the temperature of the first heat medium after merging approaches a predetermined temperature.

According to the above characteristic configuration, the waste heat recovery device is uniquely provided with the first heat medium side inlet where the first heat medium flows in, the first heat medium side outlet where the first heat medium flows out, the second heat medium side inlet where the second heat medium flows in, the second heat medium side outlet where the second heat medium flows out, and the heat exchanger that exchanges heat between the first heat medium and the second heat medium, and therefore the waste heat recovery device can realize functions of recovering heat of the first heat medium and transferring that heat to the second heat medium. In addition, in the waste heat recovery device, the expansion tank is provided in the first heat medium flow path where the first heat medium flows, and therefore, even if there is a change in the volume of the first heat medium that accompanies a change in temperature, that change in volume can be absorbed.

In addition, the mixer provided at a location where the bypass flow path and the first heat medium flow path merge together is configured to adjust the ratio of the flow rate of the first heat medium that flows through the bypass flow path and the flow rate of the first heat medium that flows through the heat exchanger, thereby mixing them such that the temperature of the first heat medium after merging approaches the predetermined temperature. As a result, the temperature of the first heat medium that flows out from the first heat medium side outlet of the waste heat recovery device of the present characteristic configuration, that is, the temperature of the first heat medium to be supplied to the heat source device that heats the first heat medium, approaches the predetermined temperature. That is, the first heat medium (cooling water) in an appropriate temperature range near the predetermined temperature is continuously supplied to the heat source device, so degradation of durability or the like of the heat source device can be suppressed.

In this way, in the waste heat recovery device of the present characteristic configuration, when an additional heat source device is provided, it is possible for the waste heat recovery device to have all of the functions of recovering heat generated by the additional heat source device, and transferring that recovered heat to the second heat medium. In addition, the waste heat recovery device does not require a large installation space, is not provided with a device that generates noise, and does not require ventilation, so even when the additional heat source device has been installed outdoors, the waste heat recovery device can be installed indoors. Therefore, it is not necessary to adopt waterproofing measures, anti-freezing measures, or the like for the waste heat recovery device.

Accordingly, it is possible to provide a waste heat recovery device that can transfer heat recovered from a heat source device installed outside of a building to existing equipment installed inside of the building.

In another characteristic configuration of a waste heat recovery device according to the present invention, the first pump is provided in the first heat medium flow path between the first heat medium side inlet and the heat exchanger and the mixer, and the expansion tank is provided in the first heat medium flow path between the first heat medium side inlet and the first pump, the inside of the expansion tank being open to the atmosphere.

According to the above characteristic configuration, with reference to the liquid surface (atmospheric pressure) of the first heat medium in the expansion tank, for example, to the first heat medium that circulates between the waste heat recovery device and the heat source device that heats the first heat medium and then sends the heated first heat medium to the waste heat recovery device, in the heat source device, a pressure is applied that is the sum of the pressure loss of the first heat medium from the heat source device to the expansion tank, and the pressure corresponding to the difference in height between the heat source device and the expansion tank. In this way, the expansion tank is provided in the first heat medium flow path between the first heat medium side inlet and the heat exchanger and the mixer, and the inside of the expansion tank is open to the atmosphere, so the pressure of the first heat medium that flows through the heat source device that heats the first heat medium can be reduced.

In still another characteristic configuration of a waste heat recovery device according to the present invention, the expansion tank is configured to be connected to a branched flow path that branches from within the first heat medium flow path.

According to the above characteristic configuration, the expansion tank is configured to be connected to a branched flow path that branches from within the first heat medium flow path. That is, the first heat medium that flows through the first heat medium flow path does not pass through the expansion tank. As a result, even if heat is radiated from the first heat medium in the expansion tank, the heat radiation does not particularly affect the temperature of the first heat medium that flows through the first heat medium flow path. Note that when a change occurs in the volume of the first heat medium that flows through the first heat medium flow path, that volume change is insured to be absorbed in the expansion tank connected to the branched flow path branched from the first heat medium flow path.

In still another characteristic configuration of a waste heat recovery device according to the present invention, the waste heat recovery device includes:

a first branched flow path configured to connect a first branching location in the first heat medium flow path to the expansion tank;

a second branched flow path configured to connect a second branching location in the first heat medium flow path on the downstream side from the first heat medium side inlet and on the upstream side from the first branching location to the expansion tank; and a flow rate adjustment mechanism capable of adjusting, among the first heat medium that flows to the second branching location through the first heat medium flow path, the amount of the first heat medium allowed to reach the expansion tank through the second branched flow path.

According to the above characteristic configuration, the amount of the first heat medium allowed to reach the expansion tank through the second branched flow path from the second branching location, and the amount of the first heat medium allowed to reach the first branching location without reaching the expansion tank from the second branching location, can be freely adjusted by the flow rate adjustment mechanism.

In still another characteristic configuration of a waste heat recovery device according to the present invention, the second branched flow path is connected to a lower portion of the expansion tank.

When the second branched flow path is connected to the upper portion of the expansion tank, there is a possibility that the first heat medium that has flowed into the expansion tank through the second branched flow path will collide with the liquid surface of the first heat medium from above, thus newly generating air bubbles.

However, in the present characteristic configuration, when the first heat medium flows into the lower portion of the expansion tank through the second branched flow path, a phenomenon in which this first heat medium collides with the liquid surface of the first heat medium in the expansion tank does not occur. As a result, air bubbles are not newly generated in the expansion tank.

In still another characteristic configuration of a waste heat recovery device according to the present invention, the flow rate adjustment mechanism includes a switching valve that switches whether to cause the entire amount of the first heat medium that flows through the first heat medium flow path to the second branching location to reach the expansion tank through the second branched flow path, or alternatively, to reach the first branching location through the first heat medium flow path without passing through the second branched flow path.

According to the above characteristic configuration, with the switching valve serving as the flow rate adjustment mechanism, it is possible to cause all of the first heat medium that flows through the first heat medium flow path to the second branching location to reach the expansion tank from the second branching location, and possible to cause all of that first heat medium to reach the first branching location from the second branching location without reaching the expansion tank. That is, when all of the first heat medium is caused to reach the first branching location from the second branching location without reaching the expansion tank, the first heat medium that flows through the first heat medium flow path does not pass through the expansion tank. As a result, even if heat is radiated from the first heat medium in the expansion tank, the heat radiation does not particularly affect the temperature of the first heat medium that flows through the first heat medium flow path. Also, when all of the first heat medium that flows through the first heat medium flow path is caused to reach the expansion tank from the second branching location, the first heat medium is temporarily retained in the expansion tank. As a result, it can be expected that air bubbles mixed into the first heat medium will be confined within the expansion tank and will not flow out from the expansion tank to the downstream side.

In still another characteristic configuration of a waste heat recovery device according to the present invention, the flow rate adjustment mechanism includes a first flow rate adjustment valve that is provided in the first heat medium flow path between the second branching location and the first branching location, and can adjust the amount of the first heat medium that flows through the first heat medium flow path, and a second flow rate adjustment valve that is provided in the second branched flow path between the second branching location and the expansion tank, and can adjust the amount of the first heat medium that flows through the second branched flow path.

According to the above characteristic configuration, by adjusting the opening degree of each of the first flow rate adjustment valve and the second flow rate adjustment valve serving as the flow rate adjustment mechanism, it is possible to cause all of the first heat medium that flows through the first heat medium flow path to the second branching location to reach the expansion tank from the second branching location, and possible to cause all of that first heat medium to reach the first branching location from the second branching location without reaching the expansion tank. In addition, in the present characteristic configuration, by adjusting the opening degree of each of the first flow rate adjustment valve and the second flow rate adjustment valve serving as the flow rate adjustment mechanism, it is possible to cause the first heat medium to reach both the expansion tank and the first branching location from the second branching location. In this way, in the present characteristic configuration, the flow speed of the first heat medium that flows through all of the first heat medium flow path can be made sufficiently high while reducing the flow speed of the first heat medium that flows through the expansion tank. By reducing the flow speed of the first heat medium that flows through the expansion tank, even if the first heat medium that has flowed into the expansion tank collides against the liquid surface within the expansion tank from above, the force of the collision becomes weaker, and the movement of the first heat medium inside the expansion tank also becomes smaller. As a result, generation of new air bubbles on the liquid surface inside the expansion tank can be suppressed, and even if air bubbles are contained in the first heat medium, the air bubbles are easily separated from the first heat medium while being retained inside the expansion tank (that is, the air bubbles can be suppressed from flowing out of the expansion tank while still mixed into the first heat medium). Also, the flow speed of the first heat medium that flows through all of the first heat medium flow path can be made sufficiently high, so air bubbles that may exist in the first heat medium at various locations in the first heat medium flow path are not confined at those locations, and flow together with the first heat medium. Also, it can be expected that the air bubbles ultimately reach the expansion tank and are eliminated from the first heat medium.

In still another characteristic configuration of a waste heat recovery device according to the present invention, the expansion tank has an opening configured to be opened to the outside, and the waste heat recovery device is provided with a tube configured for one end of the tube to be connected to the opening and the other end of the tube to be opened to the atmosphere, the tube having a length such that in a state with one end of the tube connected to the opening, the other end of the tube can be drawn outdoors.

According to the above characteristic configuration, even if a gas has mixed into the first heat medium that flows through the first heat medium flow path, that gas is discharged from the expansion tank through the tube. More specifically, even if that gas contains a harmful component, the tube is configured to be drawn outdoors and opened to the atmosphere, so a harmful gas mixed into the first heat medium can be prevented from being discharged indoors.

In still another characteristic configuration of a waste heat recovery device according to the present invention, the mixer is a temperature-sensitive mixing valve that senses the temperature of the first heat medium after the merging, and adjusts a ratio of a flow rate of the first heat medium that flows through the bypass flow path and a flow rate of the first heat medium that flows through the heat exchanger, thereby mixing them together, and is configured to be capable of changing the setting of the predetermined temperature.

According to the above characteristic configuration, the mixer is a temperature-sensitive mixing valve that senses the temperature of the first heat medium after the merging, and adjusts the ratio of the flow rate of the first heat medium that flows through the bypass flow path and the flow rate of the first heat medium that flows through the heat exchanger, thereby mixing them together. That is, it is possible to cause the temperature of the first heat medium after merging to approach the predetermined temperature with a simple device configuration.

In addition the mixer is configured to be capable of changing the setting of the predetermined temperature, so the mixer is also capable of changing the temperature of the first heat medium after the merging, that is, the temperature of the first heat medium that flows out from the first heat medium side outlet of the waste heat recovery device. For example, in a case of constructing a system in which the first heat medium circulates between a predetermined heat source device and the waste heat recovery device of the present characteristic configuration, it is possible to cause the temperature of the first heat medium to be supplied from the waste heat recovery device to the heat source device to differ by changing the setting of the predetermined temperature with the mixer. Accordingly, even if the heat source device to be used in combination with the waste heat recovery device was, for example, substituted for another heat source device and therefore the temperature of the first heat medium required by that heat source device changes, by changing the predetermined temperature, it is possible to supply the first heat medium from the waste heat recovery device to the heat source device with the first heat medium at a temperature near the temperature required by the heat source device.

In still another characteristic configuration of a waste heat recovery device according to the present invention, the waste heat recovery device includes an external container, the waste heat recovery device having the first heat medium side inlet, the first heat medium side outlet, the second heat medium side inlet, and the second heat medium side outlet on a surface of the external container, and the waste heat recovery device having the first heat medium flow path, the second heat medium flow path, the heat exchanger, the expansion tank, the bypass flow path, and the mixer on the inside of the external container.

According to the above characteristic configuration, the waste heat recovery device can be integrated using the external container.

In another characteristic configuration of a waste heat recovery device according to the present invention, the waste heat recovery device includes a flow rate adjuster provided in the first heat medium flow path between the first pump and the first heat medium side outlet, and configured to adjust the flow rate of the first heat medium that flows out from the first heat medium side outlet.

When the waste heat recovery device is installed inside a building or the like, and the heat source device that heats the first heat medium is installed outdoors, the distance between the waste heat recovery device and the heat source device varies. Also, the difference in height between the installation location of the waste heat recovery device and the installation location of the heat source device varies. Therefore, there is a possibility of large changes in the pressure of the first heat medium that flows between the waste heat recovery device and the heat source device depending on the size of output of the first pump.

However, according to the present characteristic configuration, in the waste heat recovery device, a flow rate adjuster is provided in the first heat medium flow path, and is configured to adjust the flow rate of the first heat medium that flows out from the first heat medium side outlet. That is, by operating the flow rate adjuster, it is possible to adjust the flow rate of the first heat medium that flows out from the first heat medium side outlet. As a result, it is possible to adjust the pressure of the first heat medium that flows between the waste heat recovery device and the heat source device, that is, the pressure of the first heat medium that is applied to the heat source device.

In a characteristic configuration of heat supply system according to the present invention for attaining the above object, the heat supply system includes:

a second heat medium return path configured such that after a heat utilization unit that utilizes heat being held by the second heat medium has utilized the heat, the second heat medium is returned from the heat utilization unit, the second heat medium return path causing the flow of the second heat medium to be branched at a branching portion in the path;

a second heat medium supply path configured to supply the second heat medium to the heat utilization unit, the second heat medium supply path causing the second heat medium that flowed in a branched manner to merge at a merging portion in the path;

the above waste heat recovery device, in which the second heat medium return path after branching at the branching portion is connected to the second heat medium side inlet, and the second heat medium supply path is connected to the second heat medium side outlet;

a first heat source device that heats the first heat medium to be supplied from the waste heat recovery device through a first heat medium supply path configured to be connected to the first heat medium side outlet, and supplies the heated first heat medium to the waste heat recovery device through a first heat medium return path configured to be connected to the first heat medium side inlet; and a second heat source device that heats the second heat medium to be supplied through the second heat medium return path after branching at the branching portion, and supplies the heated second heat medium to the second heat medium supply path.

According to the above characteristic configuration, the second heat medium at a relatively low temperature after its heat has been utilized by the heat utilization unit is supplied in parallel to the waste heat recovery device and the second heat source device, and the second heat medium at a relatively high temperature after being heated by each of the waste heat recovery device and the second heat source device is supplied to the heat utilization unit. That is, the heat generated by the first heat source device is transferred to the second heat medium through the waste heat recovery device, and that heat is supplied to the heat utilization unit without passing through the second heat source device. Likewise, the heat generated by the second heat source device is transferred to the second heat medium, and that heat is supplied to the heat utilization unit without passing through the waste heat recovery device. As a result, the second heat medium at a relatively low temperature supplied from the heat utilization unit flows into the waste heat recovery device and the second heat source device, and the second heat medium at a low temperature is heated by the waste heat recovery device and the second heat source device, so the second heat medium can recover a large amount of heat from the waste heat recovery device and the second heat source device.

Also, if a configuration is adopted in which the second heat medium flows in series through the waste heat recovery device and the second heat source device, the second heat medium at a high temperature that has been heated by, for example, the device on the upstream side among those devices necessarily flows through the device on the downstream side. Also, heat may be radiated from the second heat medium in the device on the downstream side. However, with the present characteristic configuration, the second heat medium at a high temperature heated by one of the waste heat recovery device and the second heat source device is supplied to the heat utilization unit without passing through the other of those devices, so it is possible to avoid performing the above sort of unnecessary heat radiation.

In a characteristic configuration of an operation method for a waste heat recovery device according to the present invention for attaining the above object, in the above waste heat recovery device, the operation method includes:

performing a first flow step of causing flow of the first heat medium in the first heat medium flow path, while causing the entire amount of the first heat medium that flows through the first heat medium flow path to the second branching location to reach the expansion tank through the second branched flow path and causing the first heat medium stored in the expansion tank to reach the first branching location through the first branched flow path; and after performing the first flow step, performing a second flow step of causing flow of the first heat medium in the first heat medium flow path, while causing the entire amount of the first heat medium that flows through the first heat medium flow path to the second branching location to reach the first branching location without passing through the second branched flow path and the first branched flow path.

According to the above characteristic configuration, by performing the first flow step, flow of the first heat medium in the first heat medium flow path is performed while causing the entire amount of the first heat medium that flows through the first heat medium flow path to the second branching location to reach the expansion tank through the second branched flow path. As a result, because the first heat medium is temporarily retained in the expansion tank, it can be expected that air bubbles mixed into the first heat medium will be confined within the expansion tank and will not flow out from the expansion tank to the downstream side. That is, while the first flow step is being performed, air bubbles mixed into the first heat medium flowing through the first heat medium flow path can be sufficiently removed in the expansion tank.

Also, by performing the second flow step after performing the first flow step, the first heat medium can be caused to flow in the first heat medium flow path without passing through the expansion tank, in a state in which air bubbles have been sufficiently removed from the first heat medium.

In another characteristic configuration of an operation method for a waste heat recovery device according to the present invention for attaining the above object, in the above waste heat recovery device, the operation method includes:

performing a first flow step of causing flow of the first heat medium in the first heat medium flow path, while causing the entire amount of the first heat medium that flows through the first heat medium flow path to the second branching location to reach the expansion tank through the second branched flow path and causing the first heat medium stored in the expansion tank to reach the first branching location through the first branched flow path;

after performing the first flow step, performing a transition flow step of causing flow of the first heat medium in the first heat medium flow path, while causing a portion of the first heat medium that flows through the first heat medium flow path to the second branching location to reach the expansion tank through the second branched flow path and causing the first heat medium stored in the expansion tank to reach the first branching location through the first branched flow path, and also while causing a remaining portion of the first heat medium to reach the first branching location without passing through the second branched flow path and the first branched flow path; and after performing the transition flow step, performing a second flow step of causing flow of the first heat medium in the first heat medium flow path, while causing the entire amount of the first heat medium that flows through the first heat medium flow path to the second branching location to reach the first branching location without passing through the second branched flow path and the first branched flow path.

According to the above characteristic configuration, by performing the first flow step, flow of the first heat medium in the first heat medium flow path is performed while causing the entire amount of the first heat medium that flows through the first heat medium flow path to the second branching location to reach the expansion tank through the second branched flow path. As a result, because the first heat medium is temporarily retained in the expansion tank, it can be expected that air bubbles mixed into the first heat medium will be confined within the expansion tank and will not flow out from the expansion tank to the downstream side. That is, while the first flow step is being performed, air bubbles mixed into the first heat medium flowing through the first heat medium flow path can be sufficiently removed in the expansion tank.

By performing the transition flow step after performing the first flow step, flow of the first heat medium in the first heat medium flow path is performed while causing a portion of the first heat medium that flows through the first heat medium flow path to the second branching location to reach the expansion tank through the second branched flow path and causing the first heat medium stored in the expansion tank to reach the first branching location through the first branched flow path, and also while causing a remaining portion of the first heat medium to reach the first branching location without passing through the second branched flow path and the first branched flow path. That is, in the transition flow step, the flow speed of the first heat medium that flows through all of the first heat medium flow path can be made sufficiently high while reducing the flow speed of the first heat medium that flows through the expansion tank. By reducing the flow speed of the first heat medium that flows through the expansion tank, even if the first heat medium that has flowed into the expansion tank collides against the liquid surface within the expansion tank from above, the force of the collision becomes weaker, and the movement of the first heat medium inside the expansion tank also becomes smaller. As a result, generation of new air bubbles on the liquid surface inside the expansion tank can be suppressed, and even if air bubbles are contained in the first heat medium, the air bubbles are easily separated from the first heat medium while being retained inside the expansion tank (that is, the air bubbles can be suppressed from flowing out of the expansion tank while still mixed into the first heat medium). Also, the flow speed of the first heat medium that flows through all of the first heat medium flow path can be made sufficiently high, so air bubbles that may exist in the first heat medium at various locations in the first heat medium flow path are not confined at those locations, and flow together with the first heat medium. Also, it can be expected that the air bubbles ultimately reach the expansion tank and are eliminated from the first heat medium. Therefore, even if air bubbles mixed into the first heat medium are not completely removed by performing the first flow step, removal of air bubbles from the first heat medium can be further promoted by performing the transition flow step.

Also, by performing the second flow step after performing the transition flow step, the first heat medium can be caused to flow in the first heat medium flow path without passing through the expansion tank, in a state in which air bubbles have been sufficiently removed from the first heat medium.

BEST MODE FOR CARRYING OUT THE INVENTION

First Embodiment

Following is a description of the configuration of a waste heat recovery device 20 and a heat supply system of a first embodiment with reference to the drawings.

Figure 1:
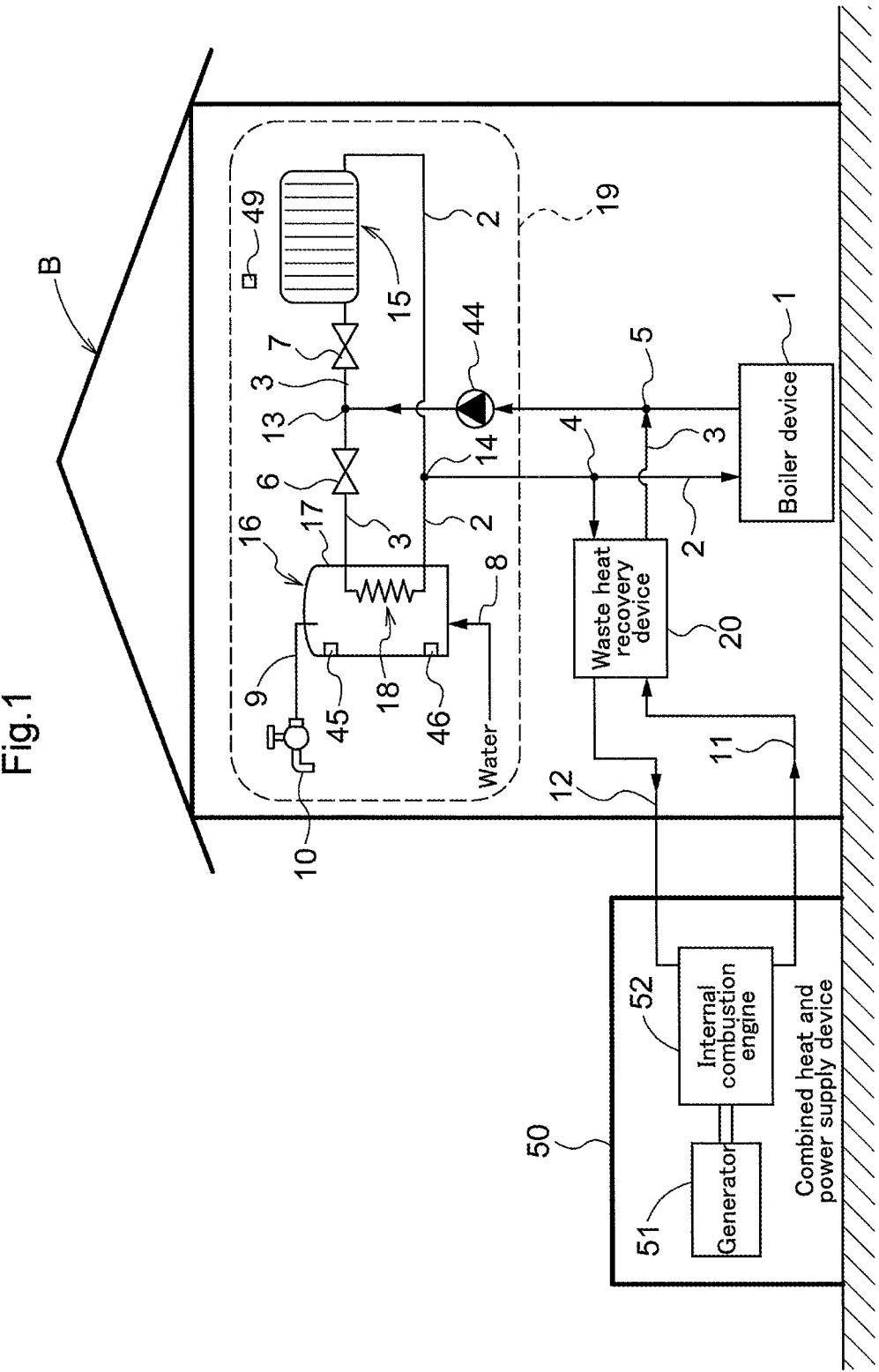
FIG. 1 shows a configuration of a heat supply system.

FIG. 1 shows the configuration of the heat supply system. As shown in the drawing, the heat supply system includes the waste heat recovery device 20, a combined heat and power supply device 50, a boiler device 1, a second heat medium supply path 3, and a second heat medium return path 2. A heat utilization unit 19 and the heat supply system are connected through the second heat medium supply path 3 and the second heat medium return path 2. Heat is supplied from the heat supply system to the heat utilization unit 19. The waste heat recovery device 20 is installed indoors in a building B, and the combined heat and power supply device 50 is installed outdoors.

The combined heat and power supply device 50 is a device that generates both heat and electricity, and has an advantage of increasing energy efficiency. The combined heat and power supply device 50 shown in FIG. 1 includes an internal combustion engine 52 and a generator 51 driven by the internal combustion engine 52. Therefore, in the combined heat and power supply device 50, heat discharged from the engine and electricity output from the generator 51 are generated.

Note that the combined heat and power supply device 50 may be configured in any manner as long as it is a device that can generate both heat and electricity. For example, a device having a fuel cell capable of generating heat and electricity, or the like, can be used as the combined heat and power supply device 50. In the present embodiment, the combined heat and power supply device 50 serves as a first heat source device that heats a first heat medium. Control of operation of the combined heat and power supply device 50 is performed by a control device C, described later.

The boiler device 1 is a device that heats a heat medium by using combustion heat generated by burning fuel, and commonly has an advantage of having large heat output. In the present embodiment, the boiler device 1 serves as a second heat source device that heats a second heat medium. Control of operation of the boiler device 1 is performed by the control device C, described later.

Figure 2:
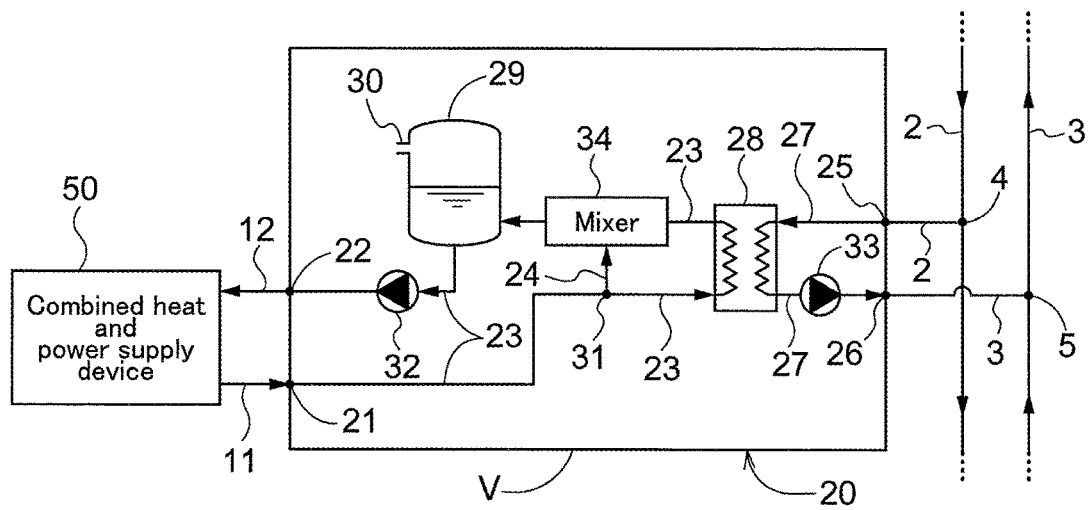
FIG. 2 shows a configuration of a waste heat recovery device of a first embodiment.

FIG. 2 shows the configuration of the waste heat recovery device 20. As shown in the drawing, the waste heat recovery device 20 performs heat exchange between a first heat medium that flows through a first heat medium flow path 23 and a second heat medium that flows through a second heat medium flow path 27 in a heat exchanger 28. The role of the waste heat recovery device 20 is to recover heat generated by the combined heat and power supply device 50 (that is, heat held by the first heat medium), and transfer that heat to the second heat medium.

The waste heat recovery device 20 includes a first heat medium side inlet 21 where the first heat medium flows in, a first heat medium side outlet 22 where the first heat medium flows out, a first heat medium flow path 23 where the first heat medium flows from the first heat medium side inlet 21 to the first heat medium side outlet 22, a first pump 32 provided in the first heat medium flow path 23 and causing the first heat medium to flow in the first heat medium flow path 23, a second heat medium side inlet 25 where the second heat medium flows in, a second heat medium side outlet 26 where the second heat medium flows out, a second heat medium flow path 27 where the second heat medium flows from the second heat medium side inlet 25 to the second heat medium side outlet 26, the heat exchanger 28 that exchanges heat between the first heat medium that flows through the first heat medium flow path 23 and the second heat medium that flows through the second heat medium flow path 27, an expansion tank 29 that absorbs volume changes of the first heat medium, a bypass flow path 24, and a mixer 34. Preferably, the waste heat recovery device 20 is provided with an external container V, and on a surface of the external container V, has the first heat medium side inlet 21, the first heat medium side outlet 22, the second heat medium side inlet 25, and the second heat medium side outlet 26, and inside of the external container V, has the first heat medium flow path 23, the second heat medium flow path 27, the heat exchanger 28, the expansion tank 29, the bypass flow path 24, and the mixer 34. The expansion tank 29 has an opening 30 configured to be opened to the outside.

A first heat medium supply path 12 where the first heat medium is supplied from the waste heat recovery device 20 to the combined heat and power supply device 50 is connected to the first heat medium side outlet 22 of the waste heat recovery device 20. A first heat medium return path 11 where the first heat medium is returned from the combined heat and power supply device 50 toward the waste heat recovery device 20 is connected to the first heat medium side inlet 21 of the waste heat recovery device 20.

The first heat medium supplied to the combined heat and power supply device 50 through the first heat medium supply path 12 is heated by heat discharged from the combined heat and power supply device 50, and the heated first heat medium returns to the waste heat recovery device 20 through the first heat medium return path 11. That is, the first heat medium circulates between the waste heat recovery device 20 and the combined heat and power supply device 50.

The first heat medium that has flowed into the inside of the waste heat recovery device 20 from the first heat medium side inlet 21 flows through the inside of the waste heat recovery device 20 through the first heat medium flow path 23, and arrives at the first heat medium side outlet 22. The heat exchanger 28, the mixer 34, the expansion tank 29, and the first pump 32 are disposed in the first heat medium flow path 23 between the first heat medium side inlet 21 and arrival at the first heat medium side outlet 22.

The second heat medium that has flowed into the inside of the waste heat recovery device 20 from the second heat medium side inlet 25 flows through the inside of the waste heat recovery device 20 through the second heat medium flow path 27, and arrives at the second heat medium side outlet 26. The heat exchanger 28 and a second pump 33 are disposed in the second heat medium flow path 27 between the second heat medium side inlet 25 and arrival at the second heat medium side outlet 26.

Control of operation of the first pump 32 to cause the first heat medium to flow in the first heat medium flow path 23, and operation of the second pump 33 to cause the second heat medium to flow in the second heat medium flow path 27, are performed by the control device C, described later.

The waste heat recovery device 20 of the present embodiment includes a bypass flow path 24 that allows the first heat medium to flow so as to bypass the heat exchanger 28 in the first heat medium flow path 23, and the mixer 34, which adjusts the ratio between the flow rate of the first heat medium that flows through the bypass flow path 24 and the flow rate of the first heat medium that flows through the heat exchanger 28. Specifically, the bypass flow path 24 is branched from a branching portion 31 in the first heat medium flow path 23, and allows the first heat medium that flows through the first heat medium flow path 23 to bypass the heat exchanger 28 when flowing.

The mixer 34 of the present embodiment is provided at the location where the bypass flow path 24 and the first heat medium flow path 23 merge, and is configured to adjust the ratio of the flow rate of the first heat medium that flows through the bypass flow path 24 and the flow rate of the first heat medium that flows through the heat exchanger 28 so as to mix these flows together. In the present embodiment, a temperature-sensitive mixing valve (three-way valve) is used as the mixer 34. The mixer 34 has, for example, a temperature-sensitive material having a large coefficient of thermal expansion, and a valve body displaced in conjunction with expansion and contraction of the temperature-sensitive material. Also, in the mixer 34, the degree of thermal expansion of the temperature-sensitive material changes according to the temperature of the first heat medium after merging, and the valve body is displaced in conjunction with the changing degree of thermal expansion, thus changing the ratio of the flow rate of the first heat medium that flows through the bypass flow path 24 and the flow rate of the first heat medium that flows through the heat exchanger 28. In other words, the mixer 34 operates automatically to adjust the ratio of the flow rate of the first heat medium that flows through the bypass flow path 24 and the flow rate of the first heat medium that flows through the heat exchanger 28 such that the temperature of the first heat medium after merging approaches a predetermined temperature.

For example, as the mixer 34, it is possible to use an automatic mixing valve (TM-type) or a temperature adjustment switching valve (TS-type) sold by Kane Kogyo Co., a wax-type temperature adjustment valve (GH5-type) sold by Fushiman Co., or the like.

The second heat medium return path 2 is connected to the second heat medium side inlet 25 of the waste heat recovery device 20. The second heat medium return path 2 is configured such that after heat of the second heat medium is utilized by the heat utilization unit 19, which utilizes heat held by the second heat medium, the second heat medium is returned from the heat utilization unit 19, and the flow of the second heat medium is branched by the branching portion 4 in the flow path. That is, the second heat medium return path 2 is a flow path in which the second heat medium at a relatively low temperature returns from the heat utilization unit 19 toward the waste heat recovery device 20.

The second heat medium supply path 3 is connected to the second heat medium side outlet 26 of the waste heat recovery device 20. The second heat medium supply path 3 is configured such that the second heat medium is supplied to the heat utilization unit 19, and the second heat medium after flowing in a branched manner is merged at a merging portion 5 in the flow path. That is, the second heat medium supply path 3 is a flow path in which the second heat medium at a relatively high temperature is supplied from the waste heat recovery device 20 toward the heat utilization unit 19.

The boiler device 1 is also connected to the second heat medium supply path 3 and the second heat medium return path 2. Also, the second heat medium branched at the branching portion 4 in the second heat medium return path 2 is supplied to each of the waste heat recovery device 20 and the boiler device 1. From the waste heat recovery device 20 and the boiler device 1, the second heat medium merges at the merging portion 5 in the second heat medium supply path 3. Then, the second heat medium is supplied through the second heat medium supply path 3 to the heat utilization unit 19, which utilizes the heat being held by the second heat medium, and after the heat has been utilized by the heat utilization unit 19, the second heat medium is returned through the second heat medium return path 2. The circulation pump 44 is provided in the second heat medium supply path 3. Control of operation of the circulation pump 44 is performed by the control device C, described later.

In this manner, the waste heat recovery device 20 and the boiler device 1 are provided parallel to the second heat medium supply path 3 and the second heat medium return path 2. That is, the heat generated by the combined heat and power supply device 50 is transferred to the second heat medium through the waste heat recovery device 20, and that heat is supplied to the heat utilization unit 19 without passing through the boiler device 1. Similarly, the heat generated by the boiler device 1 is transferred to the second heat medium, and that heat is supplied to the heat utilization unit 19 without passing through the waste heat recovery device 20. Then, the second heat medium having a relatively low temperature supplied from the heat utilization unit 19 flows into the waste heat recovery device 20 and the boiler device 1, and the second heat medium at a low temperature is heated in the waste heat recovery device 20 and the boiler device 1, so the second heat medium can recover a large amount of heat from the waste heat recovery device 20 and the boiler device 1. Also, the second heat medium at a high temperature heated by one of the waste heat recovery device 20 and the boiler device 1 is supplied to the heat utilization unit 19 without passing through the other of those devices, so it is possible to avoid performing unnecessary heat radiation.

In the present embodiment, the heat utilization unit 19 has a hot water storage device 16 and an indoor heating device 15.

The hot water storage device 16 has a tank 17 that stores hot water and a heat exchange unit 18.

A hot water discharge path 9 that allows hot water stored in the tank 17 to flow to the outside of the tank 17 is connected to an upper portion of the tank 17. A water supply path 8 that allows water replenished according to the outflow of hot water from the hot water discharge path 9 to flow into the tank 17 is connected to a lower portion of the tank 17. Water pressure is constantly applied to the hot water within the tank 17 from the water supply path 8. A hot water supply terminal 10 such as a faucet is connected to an end portion of the hot water discharge path 9. When the hot water supply terminal 10 is opened, the hot water inside of the tank 17 is delivered to the hot water supply terminal 10 through the hot water discharge path 9 by the water pressure being applied inside of the tank 17.

The second heat medium flows through the heat exchange unit 18. In the heat exchange unit 18, heat exchange is performed between the hot water stored in the tank 17 and the second heat medium. That is, in the heat exchange unit 18, heating and temperature increase of the hot water inside of the tank 17 is performed using the heat held by the second heat medium.

As described above, the tank 17 is configured so that at the same time as hot water is withdrawn from the hot water discharge path 9 connected to the upper portion, water is replenished from the water supply path 8 connected to the lower portion, so hot water at a relatively low temperature exists in the vicinity of the connection location of the water supply path 8. Also, hot water at a relatively high temperature is stored above the hot water at a relatively low temperature.

The tank 17 is provided with a temperature detection unit that measures the temperature of the stored hot water. In the present embodiment, a plurality of temperature sensors 45 and 46 are provided as temperature detection units in the tank 17. The first temperature sensor 46 serving as a first temperature detection unit is provided relatively lower inside of the tank 17 of the hot water storage device 16 than the second temperature sensor 45 serving as a second temperature detection unit. That is, the first temperature of the hot water measured by the first temperature sensor 46 is the temperature of the hot water stored relatively lower inside the tank 17 of the hot water storage device 16 than the hot water of the second temperature measured by the second temperature sensor 45. The measurement results of the first temperature sensor 46 and the second temperature sensor 45 are transmitted to the control device C, described later. These temperature sensors 45 and 46 can be realized using, for example, a thermocouple, a thermistor, or the like.

Regarding the hot water storage device 16, in one day, a temperature increase permitted time zone where a temperature increase operation of the hot water stored inside of the tank 17 of the hot water storage device 16 is permitted, and a temperature increase unpermitted time zone where a temperature increase operation is not permitted, are set, and for example, this setting information is stored in a storage device 47. The temperature increase permitted time zone and the temperature increase unpermitted time zone are items of information input by a user or the like of the heat supply system using an input device 48 described later, or information determined in advance with respect to the hot water storage device 16.

The indoor heating device 15 is a device that performs indoor heating using the heat being held by the second heat medium. More specifically, the indoor heating device 15 heats a room by exchanging heat between the second heat medium and air within the room, that is, by causing the second heat medium to radiate heat. A room temperature sensor 49 serving as a room temperature detection unit that measures the temperature of air within the room is provided in the room. Measurement results of the room temperature sensor 49 are transmitted to the control device C, described later. The room temperature sensor 49 can be realized using, for example, a thermocouple, a thermistor, or the like.

Regarding the indoor heating device 15, in one day, an indoor heating permitted time zone where operation of the indoor heating device 15 is permitted, and an indoor heating unpermitted time zone where operation is not permitted, are set, and for example, this setting information is stored in the storage device 47. The indoor heating permitted time zone and the indoor heating unpermitted time zone are items of information input by a user or the like of the heat supply system using the input device 48, or information determined in advance with respect to the indoor heating device 15.

In the heat utilization unit 19, the second heat medium supply path 3 is branched at a branching portion 13, and the second heat medium is supplied in parallel to the hot water storage device 16 and the indoor heating device 15. That is, the second heat medium at the same temperature is supplied to the hot water storage device 16 and the indoor heating device 15. In the second heat medium supply path 3 between the branching portion 13 and the hot water storage device 16, the opening/closing valve 6 that opens/closes that flow path is provided. In the second heat medium supply path 3 between the branching portion 13 and the indoor heating device 15, the opening/closing valve 7 that opens/closes that flow path is provided.

The second heat medium return path 2 where the second heat medium flows after the heat has been used in the hot water storage device 16, and the second heat medium return path 2 where the second heat medium flows after the heat has been used in the indoor heating device 15, merge together at a merging portion 14. Control of operation of the opening/closing valve 6 and the opening/closing valve 7 is performed by the control device C, described later.

As described above, the flow state of the second heat medium in the second heat medium supply path 3 and the second heat medium return path 2 is adjusted by the circulation pump 44, the second pump 33, the opening/closing valve 6, and the opening/closing valve 7. The circulation pump 44, the second pump 33, the opening/closing valve 6 and the opening/closing valve 7 function as flow state adjustment devices that adjust the flow state of the second heat medium in the second heat medium supply path 3 and the second heat medium return path 2.

Figure 3:
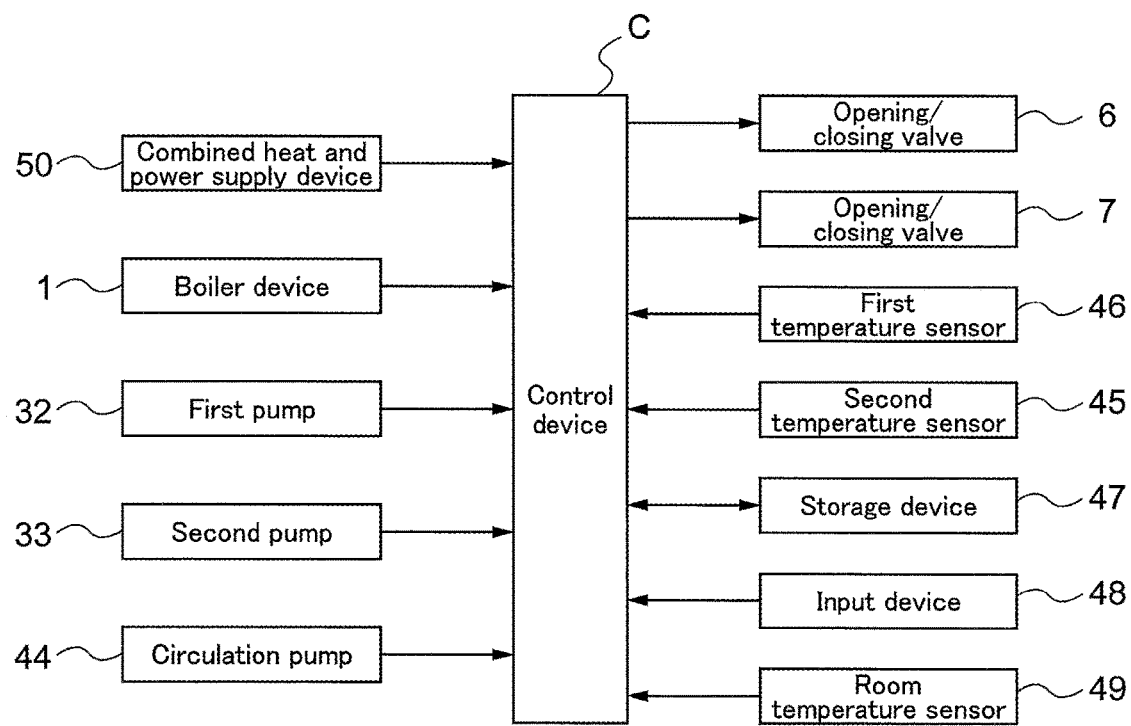
FIG. 3 is a functional block diagram of the heat supply system.

FIG. 3 is a control block diagram of the heat supply system. As described above, the control device C that controls operation of the heat supply system controls operation of the combined heat and power supply device 50, the boiler device 1, the first pump 32, the second pump 33, the circulation pump 44, the opening/closing valve 6, the opening/closing valve 7, and the like. Also, the measurement results of the first temperature sensor 46, the measurement results of the second temperature sensor 45, the measurement results of the room temperature sensor 49, and the like are transmitted to the control device C. Information input by the input device 48 is also transmitted to the control device C. Information handled by the control device C, such as these items of information transmitted to the control device C, can be stored in the storage device 47.

Next, operation of the mixer 34 will be described.

For example, at the start of operation of the combined heat and power supply device 50, the temperature of the first heat medium supplied from the combined heat and power supply device 50 to the first heat medium side inlet 21 is low, so the temperature of the first heat medium after mixing by the mixer 34 is low. At this time, in the mixer 34, most of the first heat medium is caused to flow through a high temperature side (the bypass flow path 24 side). The temperature of the first heat medium supplied from the combined heat and power supply device 50 to the first heat medium side inlet 21 increases, and when the temperature of the first heat medium after mixing by the mixer 34 approaches the predetermined temperature, the mixer 34 gradually increases the flow rate of the first heat medium that flows through a low temperature side (the heat exchanger 28 side), and decreases the flow rate of the first heat medium that flows through the high temperature side (the bypass flow path 24 side). Afterward, when the temperature of the first heat medium after mixing by the mixer 34 exceeds the predetermined temperature, the mixer 34 increases the flow rate of the first heat medium that flows through the low temperature side (the heat exchanger 28 side) in order to lower the temperature.

In this way, in the mixer 34, instead of changing the flow rate of the first heat medium of only any one of the high temperature side (the bypass flow path 24 side) and the low temperature side (the heat exchanger 28 side), by changing both flow rates, the ratio of the flow rate of the first heat medium that flows through the high temperature side (the bypass flow path 24 side) and the flow rate of the first heat medium that flows through the low temperature side (the heat exchanger 28 side) are changed, and thus the mixer 34 automatically operates so that the temperature of the first heat medium after merging approaches the predetermined temperature. As a result, the temperature of the first heat medium that flows out from the waste heat recovery device 20 and is supplied to the combined heat and power supply device 50 approaches the predetermined temperature. Then, the first heat medium (cooling water) in an appropriate temperature range near the predetermined temperature is continuously supplied to the internal combustion engine 52 of the combined heat and power supply device 50.

In addition, as the mixer 34, a temperature-sensitive mixing valve capable of manual setting and changing of the predetermined temperature can be used. For example, a configuration may be adopted in which the mixer 34 has a manual operation unit capable of changing the positional relationship between the above-described temperature-sensitive material and the valve body. In this way, when the mixer 34 is configured using a temperature-sensitive mixing valve configured such that the setting of the predetermined temperature can be changed, the temperature of the first heat medium that flows out from the mixer 34, that is, the temperature of the first heat medium that flows out from the first heat medium side outlet 22 of the waste heat recovery device 20, can be changed. In other words, it is possible to change the temperature of the first heat medium that flows out from the waste heat recovery device 20 and is supplied to the combined heat and power supply device 50. Therefore, even if the heat source device used in combination with the waste heat recovery device 20 is changed and so the temperature of the first heat medium (that is, the temperature of the cooling water) required by the heat source device is changed, by changing the predetermined temperature, it is possible to supply the first heat medium at a temperature close to the temperature required by the heat source device from the waste heat recovery device 20 to the heat source device.

Next is a description of the timing of operating the combined heat and power supply device 50 and the waste heat recovery device 20, and the timing of operating the boiler device 1.

Regarding the combined heat and power supply device 50, in one day, a combined heat and power supply permitted time zone where operation of the combined heat and power supply device 50 is permitted, and a combined heat and power supply unpermitted time zone where operation of the combined heat and power supply device 50 is not permitted, are set, and for example, this setting information is stored in the storage device 47. The combined heat and power supply permitted time zone and the combined heat and power supply unpermitted time zone are items of information input by a user or the like of the heat supply system using the input device 48, or information determined in advance with respect to the combined heat and power supply device 50.

Regarding the boiler device 1, in one day, a boiler permitted time zone where operation of the boiler device 1 is permitted, and a boiler unpermitted time zone where operation of the boiler device 1 is not permitted, are set, and for example, this setting information is stored in the storage device 47. The boiler permitted time zone and the boiler unpermitted time zone are items of information input by a user or the like of the heat supply system using the input device 48, or information determined in advance with respect to the boiler device 1.

Hot Water Storage Device 16

In the heat supply system of the present embodiment, when the temperature of the hot water stored in the hot water storage device 16 has decreased, it is possible to increase the temperature of the hot water with the heat generated by the combined heat and power supply device 50. In that case, when the current time is in the temperature increase permitted time zone and the combined heat and power supply permitted time zone, and the first temperature (the temperature of the hot water measured by the first temperature sensor 46) of the hot water inside of the tank 17 of the hot water storage device 16 to be heated is the first lower limit temperature or less, where a temperature increase operation by the combined heat and power supply device 50 is permitted, the control device C operates the combined heat and power supply device 50, and operates the flow state adjustment devices (the circulation pump 44, the second pump 33, the opening/closing valve 6, and the opening/closing valve 7) such that the heat medium circulates between the waste heat recovery device 20 and the hot water storage device 16 through the second heat medium supply path 3 and the second heat medium return path 2. That is, the control device C operates the internal combustion engine 52 and the generator 51 included in the combined heat and power supply device 50, operates the first pump 32 and the second pump 33 included in the waste heat recovery device 20, operates the circulation pump 44, and opens the opening/closing valve 6. As a result, the heat generated by the combined heat and power supply device 50 is transferred to the first heat medium, and the heat held by the first heat medium is transferred to the second heat medium through the waste heat recovery device 20. In addition, the second heat medium passes through the second heat medium supply path 3 and is supplied to the heat exchange unit 18 of the hot water storage device 16, and thus the temperature of the hot water inside of the tank 17 is increased.

Note that even when the current time is in the temperature increase permitted time zone and the combined heat and power supply permitted time zone, if the first temperature of the hot water measured with the first temperature sensor 46 is higher than the first lower limit temperature, that is, if hot water that is still at a sufficiently high temperature is stored in the tank 17 of the hot water storage device 16, the control device C does not operate the combined heat and power supply device 50 and the waste heat recovery device 20.

Also, even if the first temperature of the hot water measured with the first temperature sensor 46 is the first lower limit temperature or less, that is, even if the temperature of the hot water stored in the tank 17 of the hot water storage device 16 is low, if the current time is not in a time zone that overlaps the temperature increase permitted time zone and the combined heat and power supply permitted time zone (if the current time is in the temperature increase unpermitted time zone or the combined heat and power supply unpermitted time zone), the control device C does not operate the combined heat and power supply device 50 and the waste heat recovery device 20.

In the heat supply system of the present embodiment, when the temperature of the hot water stored in the hot water storage device 16 has decreased, it is possible to increase the temperature of the hot water with the heat generated by the boiler device 1. In that case, when the current time is in the temperature increase permitted time zone and the boiler permitted time zone, and the second temperature (the temperature of the hot water measured by the second temperature sensor 45) of the hot water inside of the tank 17 of the hot water storage device 16 to be heated is the second lower limit temperature or less, where a temperature increase operation by the boiler device 1 is permitted, the control device C operates the boiler device 1, and operates the flow state adjustment devices such that the heat medium circulates between the boiler device 1 and the hot water storage device 16 through the second heat medium supply path 3 and the second heat medium return path 2. That is, the control device C operates the boiler device 1, operates the circulation pump 44, and opens the opening/closing valve 6. As a result, the heat generated by the boiler device 1 is transferred to the second heat medium. In addition, the second heat medium passes through the second heat medium supply path 3 and is supplied to the heat exchange unit 18 of the hot water storage device 16, and thus the temperature of the hot water inside of the tank 17 is increased.

Note that even when the current time is in the temperature increase permitted time zone and the boiler permitted time zone, if the second temperature of the hot water measured with the second temperature sensor 45 is higher than the second lower limit temperature, that is, if hot water that is still at a sufficiently high temperature is stored in the tank 17 of the hot water storage device 16, the control device C does not operate the boiler device 1.

Also, even if the second temperature of the hot water measured with the second temperature sensor 45 is the second lower limit temperature or less, that is, even if the temperature of the hot water stored in the tank 17 of the hot water storage device 16 is low, if the current time is not in a time zone that overlaps the temperature increase permitted time zone and the boiler permitted time zone (if the current time is in the temperature increase unpermitted time zone or the boiler unpermitted time zone), the control device C does not operate the boiler device 1.

Indoor Heating Device 15

In the heat supply system of the present embodiment, when the air temperature within the building B has decreased, a temperature increase of the air inside a building B can be performed by the indoor heating device 15 utilizing the heat generated by the combined heat and power supply device 50. In this case, when the current time is in the indoor heating permitted time zone and the combined heat and power supply permitted time zone, and the temperature of the air to be heated (the temperature of the air measured by the room temperature sensor 49) satisfies a temperature condition where an indoor heating operation by the indoor heating device 15 is permitted (for example, when the air temperature is a third lower limit temperature or less), the control device C operates the combined heat and power supply device 50, and operates the flow state adjustment devices such that the heat medium circulates between the waste heat recovery device 20 and the indoor heating device 15 through the second heat medium supply path 3 and the second heat medium return path 2. That is, the control device C operates the internal combustion engine 52 and the generator 51 included in the combined heat and power supply device 50, operates the first pump 32 and the second pump 33 included in the waste heat recovery device 20, operates the circulation pump 44, and opens the opening/closing valve 7. As a result, the heat generated by the combined heat and power supply device 50 is transferred to the first heat medium, and further, the heat held by the first heat medium is transferred to the second heat medium through the waste heat recovery device 20. In addition, the second heat medium passes through the second heat medium supply path 3 and is supplied to the indoor heating device 15, and thus heat radiation of the second heat medium by the indoor heating device 15 (indoor heating) is performed.

Note that even when the current time is in the indoor heating permitted time zone and the combined heat and power supply permitted time zone, if the temperature of the air measured by the room temperature sensor 49 does not satisfy the above temperature condition (for example, when the measured temperature is higher than the third lower limit temperature), that is, when the room temperature is sufficiently high, the control device C does not operate the indoor heating device 15.

Also, even when the temperature of the air measured by the room temperature sensor 49 satisfies the temperature condition, that is, even when the room temperature is low, if the current time is not in a time zone that overlaps the indoor heating permitted time zone and the combined heat and power supply permitted time zone (if the current time is in the indoor heating unpermitted time zone or the combined heat and power supply unpermitted time zone), the control device C does not operate the indoor heating device 15.

In the heat supply system of the present embodiment, when the air temperature within the building B has decreased, a temperature increase of the air inside the building B can also be performed by the indoor heating device 15 using the heat generated by the boiler device 1. In this case, when the current time is in the indoor heating permitted time zone and the boiler permitted time zone, and the temperature of the air to be heated (the temperature of the air measured by the room temperature sensor 49) satisfies a temperature condition where an indoor heating operation by the indoor heating device 15 is permitted (for example, when the temperature is the third lower limit temperature or less), the control device C operates the boiler device 1, and operates the flow state adjustment devices such that the heat medium circulates between the boiler device 1 and the indoor heating device 15 through the second heat medium supply path 3 and the second heat medium return path 2. That is, the control device C operates the boiler device 1, operates the circulation pump 44, and opens the opening/closing valve 7. As a result, the heat generated by the boiler device 1 is transferred to the second heat medium. In addition, the second heat medium passes through the second heat medium supply path 3 and is supplied to the indoor heating device 15, and thus heat radiation of the second heat medium by the indoor heating device 15 (indoor heating) is performed.

Note that even when the current time is in the indoor heating permitted time zone and the boiler permitted time zone, if the temperature of the air measured by the room temperature sensor 49 does not satisfy the temperature condition (for example, when the measured temperature is higher than the third lower limit temperature), that is, when the room temperature is sufficiently high, the control device C does not operate the indoor heating device 15.

Also, even when the temperature of the air measured by the room temperature sensor 49 satisfies the temperature condition, that is, even when the room temperature is low, if the current time is not in a time zone that overlaps the indoor heating permitted time zone and the boiler permitted time zone (if the current time is in the indoor heating unpermitted time zone or the boiler unpermitted time zone), the control device C does not operate the indoor heating device 15.

Above, operation to increase the temperature of the hot water of the hot water storage device 16 using the heat generated by the combined heat and power supply device 50, operation to increase the temperature of the hot water of the hot water storage device 16 using the heat generated by the boiler device 1, operation to increase the temperature of air inside the building B by the indoor heating device 15 using the heat generated by the combined heat and power supply device 50, and operation to increase the temperature of air inside the building B by the indoor heating device 15 using the heat generated by the boiler device 1, are respectively described, but depending on the settings of each permission time zone and each temperature condition described above, the control device C may also cause two or more operations among the above operations to overlap in time.

Second Embodiment

The waste heat recovery device 20 of the second embodiment differs from the above embodiment by having a flow rate adjuster. In the following description of the waste heat recovery device 20 of the second embodiment, a description of the same configurations as in the above embodiment is omitted.

Figure 4:
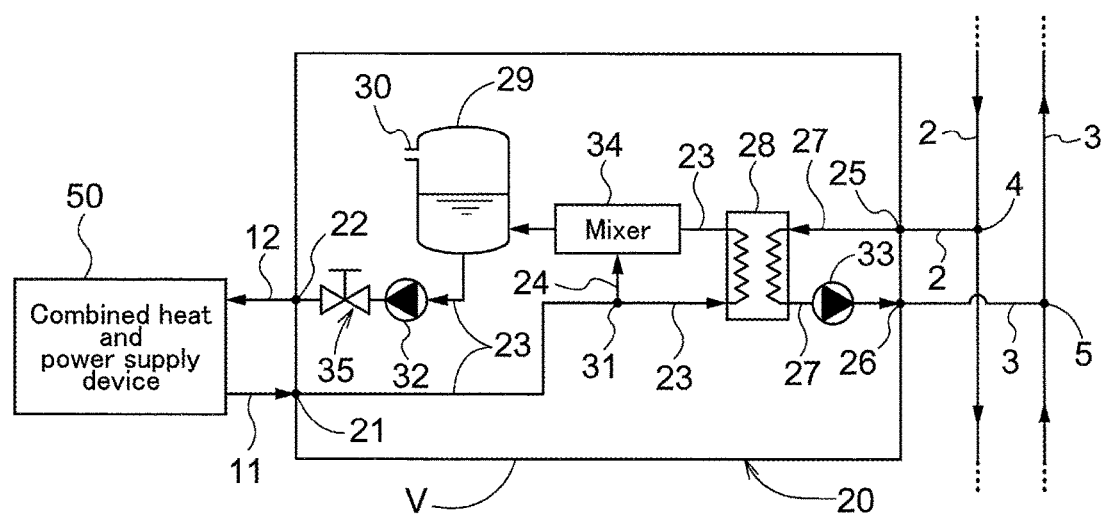
FIG. 4 shows a waste heat recovery device having another configuration.

FIG. 4 shows the configuration of the waste heat recovery device 20 of the second embodiment.

When the waste heat recovery device 20 is installed indoors in the building B and the combined heat and power supply device 50 is installed outdoors, the length of the first heat medium supply path 12 and the first heat medium return path 11 that connect the waste heat recovery device 20 to the combined heat and power supply device 50 varies. The difference in height between the installation location of the waste heat recovery device 20 and the installation location of the combined heat and power supply device 50 also varies. Therefore, there is a possibility of large changes in the pressure of the first heat medium that flows between the waste heat recovery device 20 and the combined heat and power supply device 50 depending on the size of output of the first pump 32.

However, as shown in FIG. 4, in the waste heat recovery device 20 of the second embodiment, a throttle valve 35 serving as a flow rate adjuster for adjusting the flow rate of the first heat medium that flows out from the first heat medium side outlet 22 is provided in the first heat medium flow path 23. As in the above embodiment, the throttle valve 35 also is accommodated in the external container V. The first heat medium that has flowed into the inside of the waste heat recovery device 20 from the first heat medium side inlet 21 flows in sequence through the mixer 34 and the heat exchanger 28, the expansion tank 29, the first pump 32, and the throttle valve 35, and flows out from the first heat medium side outlet 22 to the outside of the waste heat recovery device 20. That is, by operating the throttle valve 35, a user can adjust the flow rate of the first heat medium that flows out from the first heat medium side outlet 22 without changing the output of the first pump 32. As a result, it is possible to adjust the pressure of the first heat medium that is applied to the combined heat and power supply device 50.

Third Embodiment

In the waste heat recovery device 20 of the third embodiment, the position where the expansion tank 29 is provided differs from the above embodiments. In the following description of the waste heat recovery device 20 of the third embodiment, a description of the same configurations as in the above embodiments is omitted.

Figure 5:
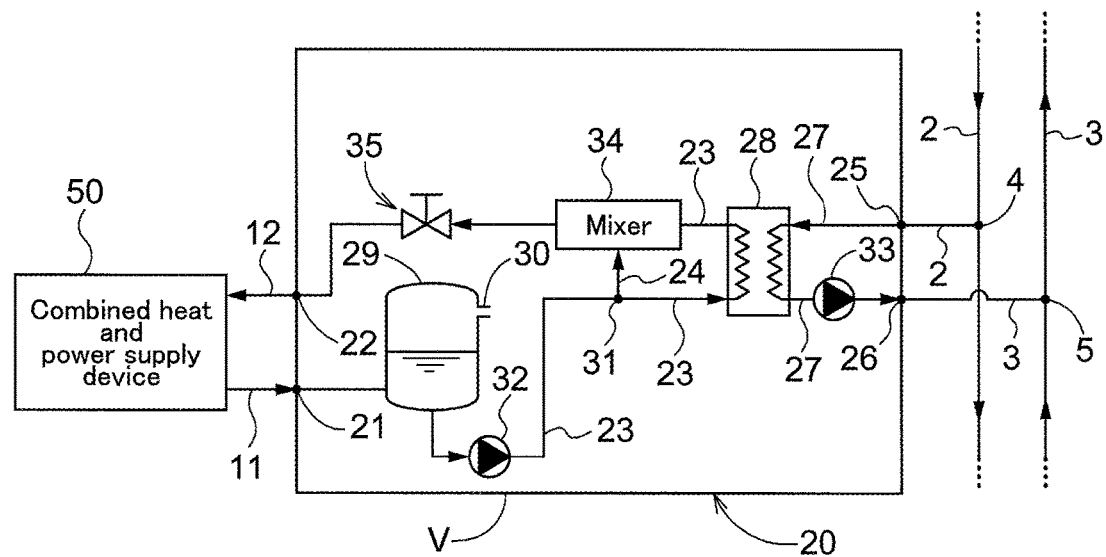
FIG. 5 shows a waste heat recovery device having another configuration.

FIG. 5 shows the configuration of the waste heat recovery device 20 of the third embodiment. As shown in the drawing, in the waste heat recovery device 20 of the third embodiment, the expansion tank 29 is provided in the first heat medium flow path 23 between the first heat medium side inlet 21 and the heat exchanger 28 and the mixer 34. The inside of the expansion tank 29 is opened to the atmosphere by the opening 30. In addition, the expansion tank 29 is provided at a position in the first heat medium flow path 23 closer to the first heat medium side inlet 21 than the first pump 32 is, that is, at a position closer to the combined heat and power supply device 50. That is, in the heat supply system of the present embodiment, with reference to the liquid surface (atmospheric pressure) of the first heat medium in the expansion tank 29, to the first heat medium that flows through the combined heat and power supply device 50, a pressure is applied that is the sum of the pressure loss of the first heat medium from the combined heat and power supply device 50 to the expansion tank 29, and the pressure corresponding to the difference in height between the combined heat and power supply device 50 and the expansion tank 29. In this manner, the expansion tank 29 is provided in the first heat medium flow path 23 between the first heat medium side inlet 21 and the heat exchanger 28 and the mixer 34, and the inside of the expansion tank 29 is open to the atmosphere, so the pressure of the first heat medium applied to the combined heat and power supply device 50 can be made relatively low.

Note that although the throttle valve 35 serving as a flow rate adjuster described in the second embodiment is provided also in the waste heat recovery device 20 of the third embodiment shown in FIG. 5, a configuration may be adopted in which this throttle valve 35 is not provided, as in the first embodiment.

Fourth Embodiment

In the waste heat recovery device 20 of the fourth embodiment, the form of connection of the expansion tank 29 to the first heat medium flow path 23 differs from the above embodiments. In the following description of the waste heat recovery device 20 of the fourth embodiment, a description of the same configurations as in the above embodiments is omitted.

Figure 6:
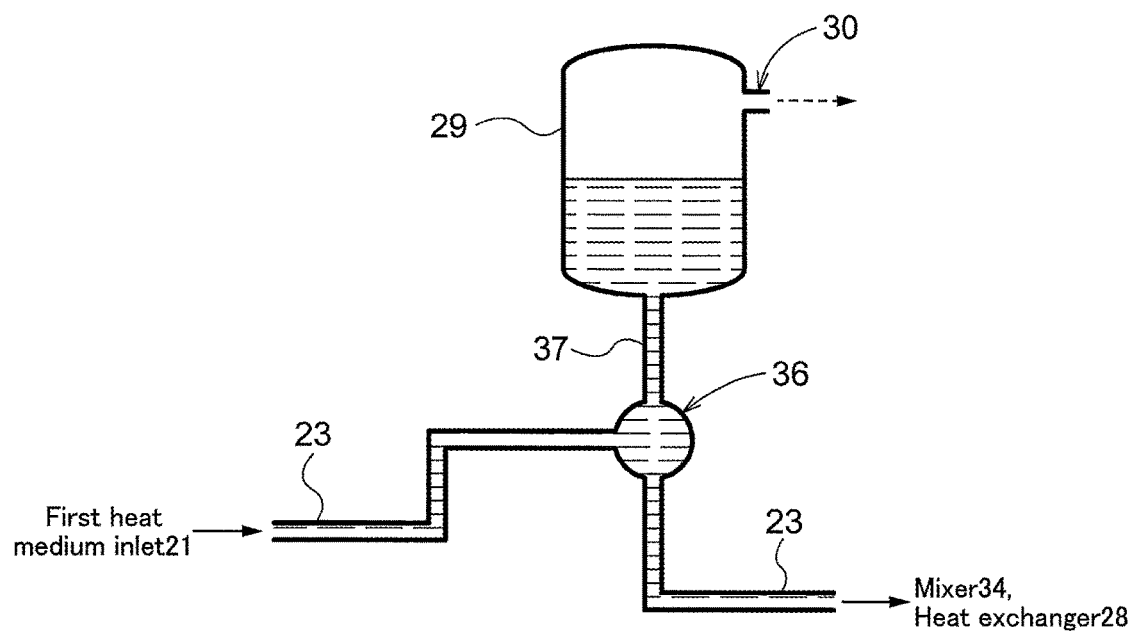
FIG. 6 shows a connection state of an expansion tank to a first heat medium flow path.

FIG. 6 shows the form of connection of the expansion tank 29 to the first heat medium flow path 23.

In the waste heat recovery device 20 described in the above embodiments, the first heat medium that flows through the first heat medium flow path 23 flows while passing through the expansion tank 29, so there is a possibility of a relatively large temperature decrease of the first heat medium due to heat radiation from the first heat medium in the expansion tank 29.

However, as shown in FIG. 6, in the present embodiment, the expansion tank 29 is connected to a branched flow path 37 branched from within the first heat medium flow path 23 between the first heat medium side inlet 21 and the heat exchanger 28 and the mixer 34. That is, the first heat medium that flows through the first heat medium flow path 23 does not pass through the expansion tank 29. As a result, even if heat is radiated from the first heat medium in the expansion tank 29, the heat radiation does not particularly affect the temperature of the first heat medium that flows through the first heat medium flow path 23. Note that when a change occurs in the volume of the first heat medium that flows through the first heat medium flow path 23, that volume change is insured to be absorbed in the expansion tank 29 connected to the branched flow path 37 branched from the first heat medium flow path 23.

In addition, an air bubble reservoir 36 having a convex shape in the upward direction is provided at the location where the first heat medium flow path 23 and the branched flow path 37 are connected. As a result, even if air bubbles are mixed into the first heat medium flow path 23, the air bubbles can be confined to the air bubble reservoir 36 without flowing to the first heat medium flow path 23 on the downstream side of the air bubble reservoir 36. The air bubbles confined to the air bubble reservoir 36 move toward the expansion tank 29 through the branched flow path 37 and are discharged to the atmosphere.

Fifth Embodiment

Figure 7:
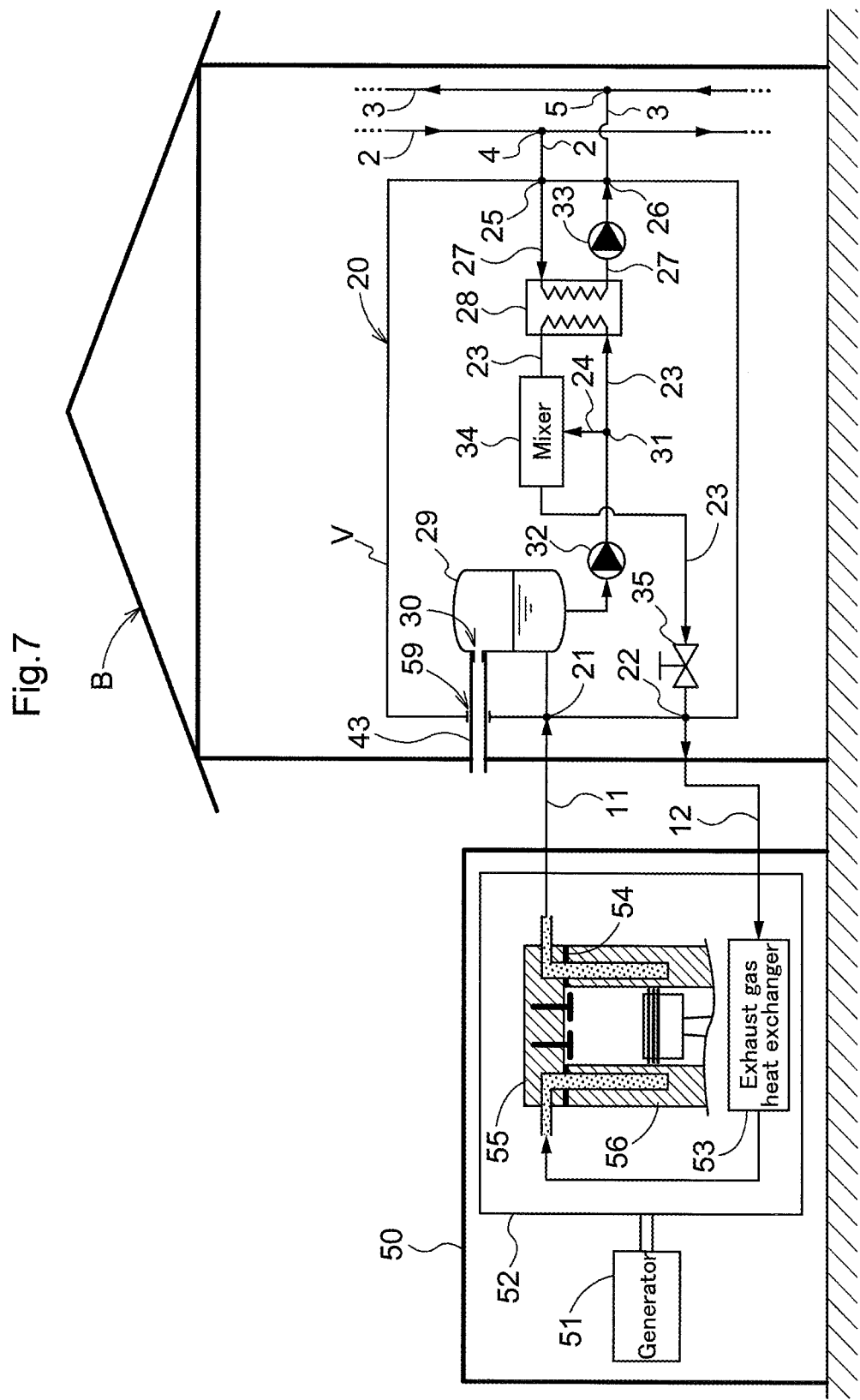
FIG. 7 shows an exemplary form of connection between the waste heat recovery device and a combined heat and power supply device.

FIG. 7 shows an example of the form of connection between the waste heat recovery device 20 and the combined heat and power supply device 50.

As shown in FIG. 7, the internal combustion engine 52 of the combined heat and power supply device 50 includes an exhaust gas heat exchanger 53, a cylinder 56 and a cylinder head 55 that surround a combustion chamber, and the like. The exhaust gas heat exchanger 53 is used to heat the first heat medium using exhaust gas discharged from the combustion chamber as a heat source. The first heat medium is caused to flow to the cylinder 56 and the cylinder head 55 as cooling water for cooling the cylinder 56 and the cylinder head 55.

A gasket 54 is installed between the cylinder 56 and the cylinder head 55, and airtightness of the combustion chamber inside the cylinder 56 is insured by this gasket 54. However, if an abnormality such as breakage of the gasket 54 occurs, there is a possibility of the gas inside the combustion chamber (a harmful gas containing carbon monoxide, unburned fuel, or the like) mixing into the first heat medium. In that case, the harmful gas mixed into the first heat medium flows into the expansion tank 29 through the first heat medium return path 11.

However, in the present embodiment, the expansion tank 29 has the opening 30 configured to be opened to the outside. Also, the waste heat recovery device 20 has a tube 43 configured for one end of the tube 43 to be connected to the opening 30 and the other end of the tube 43 to be opened to the atmosphere. The tube 43 has a length such that in a state with one end of the tube 43 connected to the opening 30, the other end can be drawn outdoors. In the waste heat recovery device 20, a hole 59 where the tube 43 can pass through is formed in the external container V in advance. The tube 43 whose one end is to be connected to the opening 30 of the expansion tank 29 accommodated inside the external container V is installed such that by passing through the hole 59 of the external container V, the other end is drawn outdoors and opened to the atmosphere. As a result, even if a harmful gas mixed into the first heat medium enters inside the expansion tank 29, the harmful gas enters into the side of the one end of the tube 43 from the opening 30 of the expansion tank 29, passes through the inside of the tube 43, and is discharged outdoors from the side on the other end of the tube 43.

The tube 43 can be manufactured using various materials such as rubber, synthetic resin, metal, or the like. Also, as long as the tube 43 has a length from the opening 30 of the expansion tank 29 to outdoors of the building B, the tube 43 may be manufactured using a single member, or may be manufactured using a combination of a plurality of members. For example, the tube 43 can be manufactured using a single tube having a length such that in a state with one end connected to the opening 30, the other end can be drawn outdoors. Alternatively, the tube 43 can be manufactured by combining a tube (an inside tube) that connects from the opening 30 to the hole 59 of the external container V, and a tube (an outside tube) that connects from the hole 59 of the external container V to the outdoors.

For example, it is also possible to adopt a manufacturing method of the waste heat recovery device 20 such that, when manufacturing the waste heat recovery device 20 provided with the tube 43 in which a plurality of tubes are combined as in the latter case, before installing the external container V of the waste heat recovery device 20 in the building B, the opening 30 of the expansion tank 29 is connected to the hole 59 of the external container V with the inside tube, and afterward, when installing the external container V of the waste heat recovery device 20 in the building B, the hole 59 of the external container V is connected to the outdoors of the building B with the outside tube. In this case, it is preferable that a portion of the hole 59 of the external container V is formed to be a joint for mediating the linkage between the inside tube and the outside tube. That is, the inside tube is connected to the opening 30 of the expansion tank 29 and a joint (the hole 59) constituting a part of the inner face side of the external container V, and the outside tube is connected to a joint (the hole 59) constituting a part of the outer face side of the external container V.

Sixth Embodiment

In the waste heat recovery device 20 of the sixth embodiment, the form of connection of the expansion tank 29 to the first heat medium flow path 23 differs from the above embodiments. In the following description of the waste heat recovery device 20 of the sixth embodiment, a description of the same configurations as in the above embodiments is omitted.

Figure 8:
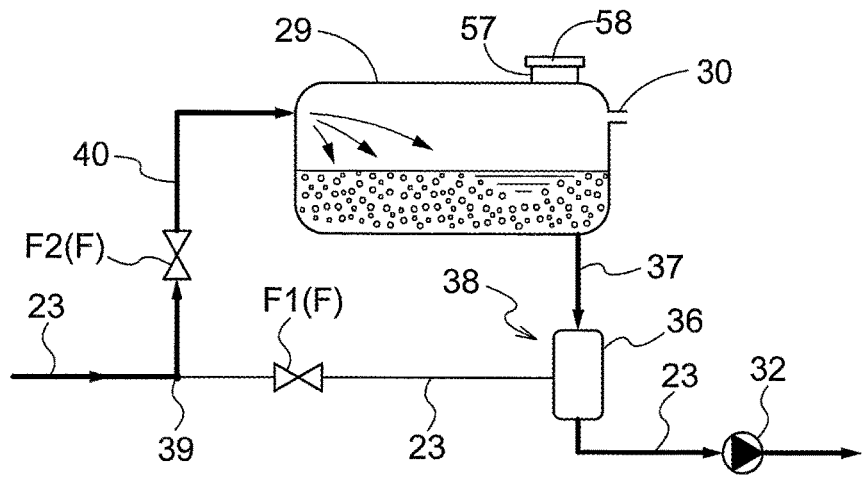
FIG. 8 shows a flow state of a heat medium in the first heat medium flow path and the expansion tank.
Figure 9:
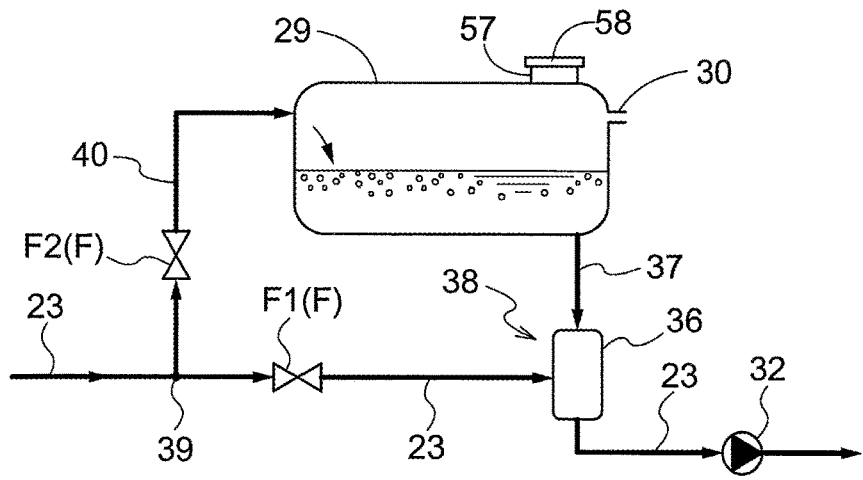
FIG. 9 shows a flow state of the heat medium in the first heat medium flow path and the expansion tank.
Figure 10:
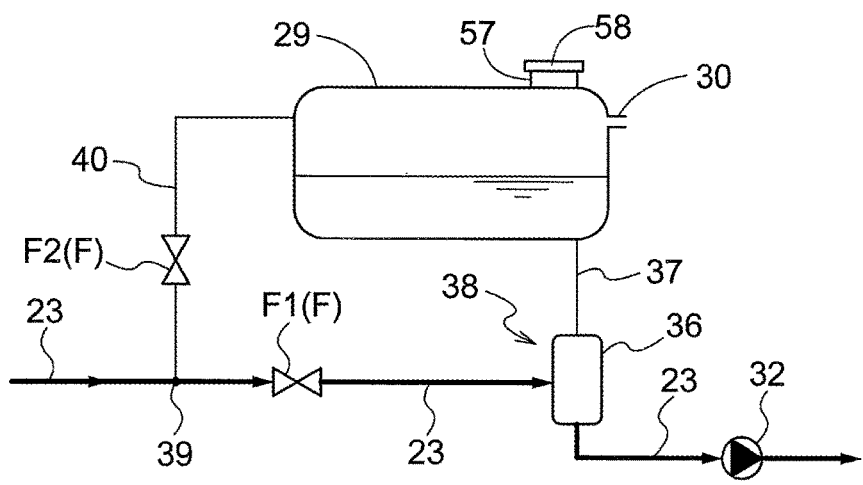
FIG. 10 shows a flow state of the heat medium in the first heat medium flow path and the expansion tank.

FIGS. 8 to 10 show the form of connection of the expansion tank 29 to the first heat medium flow path 23 inside of the waste heat recovery device 20. Also, in FIGS. 8 to 10, a path where the first heat medium flows is depicted by a bold solid line. Note that, although not shown, in the present embodiment as well, a device configuration is assumed in which the expansion tank 29 is provided in the first heat medium flow path 23 between the first heat medium side inlet 21 and the first pump 32, and the first pump 32 is provided in the first heat medium flow path 23 between the first heat medium side inlet 21 and the heat exchanger 28 and the mixer 34. Also, the first heat medium circulates between the waste heat recovery device 20 and the combined heat and power supply device 50.

The waste heat recovery device 20 includes a first branched flow path (branched flow path) 37 that connects a first branching location 38 in the first heat medium flow path 23 to the expansion tank 29, a second branched flow path 40 that connects a second branching location 39 in the first heat medium flow path 23 on the downstream side from the first heat medium side inlet 21 and on the upstream side from the first branching location 38 to the expansion tank 29, and a flow rate adjustment mechanism F capable of adjusting, among the first heat medium that flows to the second branching location 39 through the first heat medium flow path 23, the amount of the first heat medium allowed to reach the expansion tank 29 through the second branched flow path 40. In addition, the air bubble reservoir 36 is provided at the location where the first heat medium flow path 23 and the first branched flow path 37 are connected (the first branching location 38).

In the present embodiment, the flow rate adjustment mechanism F includes a first flow rate adjustment valve F1 that is provided in the first heat medium flow path 23 between the second branching location 39 and the first branching location 38, and can individually adjust the amount of the first heat medium that flows through the first heat medium flow path 23, and a second flow rate adjustment valve F2 that is provided in the second branched flow path 40 between the second branching location 39 and the expansion tank 29, and can individually adjust the amount of the first heat medium that flows through the second branched flow path 40. The first flow rate adjustment valve F1 and the second flow rate adjustment valve F2 are valves whose opening degree is adjusted by a manual operation, valves whose opening degree is remotely controlled according to control by the control device C, or the like.

By adjusting the opening degree of each of the first flow rate adjustment valve F1 and the second flow rate adjustment valve F2 serving as the flow rate adjustment mechanism F, it is possible to cause all of the first heat medium that flows through the first heat medium flow path 23 to the second branching location 39 to reach from the second branching location 39 to the expansion tank 29, or to reach from the second branching location 39 to the first branching location 38 without reaching the expansion tank 29, or to reach from the second branching location 39 to both the expansion tank 29 and the first branching location 38.

In other words, in a case where the first heat medium is caused to reach from the second branching location 39 to the first branching location 38 without reaching the expansion tank 29, the first heat medium that flows through the first heat medium flow path 23 does not flow inside of the expansion tank 29. As a result, even if heat is radiated from the first heat medium in the expansion tank 29, that heat radiation can be prevented from particularly affecting the temperature of the first heat medium that flows through the first heat medium flow path 23. Also, in a case where all of the first heat medium that flows through the first heat medium flow path 23 is caused to reach from the second branching location 39 to the expansion tank 29, all of the first heat medium is temporarily retained in the expansion tank 29. As a result, it can be expected that air bubbles mixed into the first heat medium will be confined within the expansion tank 29 and will not flow out from the expansion tank 29 to the downstream side.

Furthermore, in a case where a portion of the first heat medium that flows through the first heat medium flow path 23 to the second branching location 39 is caused to reach from the second branching location 39 to the expansion tank 29, and a remaining portion of the first heat medium is caused to reach from the second branching location 39 to the first branching location 38, the flow speed of the first heat medium that flows through all of the first heat medium flow path 23 can be made sufficiently high while reducing the flow speed of the first heat medium that flows through the expansion tank 29. By reducing the flow speed of the first heat medium that flows through the expansion tank 29, even if the first heat medium that has flowed into the expansion tank 29 collides against the liquid surface within the expansion tank 29 from above, the force of the collision becomes weaker, and the movement of the first heat medium inside the expansion tank 29 also becomes smaller. As a result, generation of new air bubbles on the liquid surface inside the expansion tank 29 can be suppressed, and even if air bubbles are contained in the first heat medium, the air bubbles are easily separated from the first heat medium while being retained inside the expansion tank 29 (that is, the air bubbles can be suppressed from flowing out of the expansion tank 29 while still mixed into the first heat medium). Also, the flow speed of the first heat medium that flows through all of the first heat medium flow path 23 can be made sufficiently high, so air bubbles that may exist in the first heat medium at various locations in the first heat medium flow path 23 are not confined at those locations, and flow together with the first heat medium. Also, it can be expected that the air bubbles ultimately reach the expansion tank 29 and are eliminated from the first heat medium.

Next, an operation method for the waste heat recovery device 20 having such a configuration will be described. This operation method can be performed when the first heat medium is newly filled or additionally filled into the first heat medium flow path 23. Alternatively, this operation method can be performed, for example, at a timing when it is determined that air bubbles have mixed into the first heat medium, regardless of whether or not a first cooling medium is newly filled. The timing when it is determined that air bubbles have mixed into the first heat medium means, for example, a timing at which the water level in the expansion tank 29 becomes a predetermined threshold value or higher, that is, a timing at which due to air bubbles mixing into the first heat medium that flows through the first heat medium flow path 23, the water level in the expansion tank 29 is deemed to have risen by the volume of those air bubbles. The first heat medium is injected into the expansion tank 29 from an injection port 57 provided in the upper portion of the expansion tank 29. The injection port 57 can be hermetically sealed by a lid 58.

FIG. 8 shows the flow state of the first heat medium immediately after injection of the first heat medium from the injection port 57 of the expansion tank 29, or immediately after it is determined that air bubbles are mixed into the first heat medium. At this time, the first heat medium is caused to flow through the first heat medium flow path 23 while operating the first pump 32 and adjusting the opening degree of each of the first flow rate adjustment valve F1 and the second flow rate adjustment valve F2 (that is, by setting the first flow rate adjustment valve F1 to a closed state, and setting the second flow rate adjustment valve F2 to an open state) to cause the entire amount of the first heat medium that flows through the first heat medium flow path 23 to the second branching location 39 to reach the expansion tank 29 through the second branched flow path 40, and to cause the first heat medium stored in the expansion tank 29 to reach the first branching location 38 through the first branched flow path 37 (a first flow step).

When such a first flow step is performed, flow of the first heat medium in the first heat medium flow path 23 is performed while causing the entire amount of the first heat medium that flows through the first heat medium flow path 23 to the second branching location 39 to reach the expansion tank 29 through the second branched flow path 40. As a result, all of the first heat medium is temporarily retained in the expansion tank 29, so air bubbles mixed into the first heat medium are confined in the expansion tank 29, and can be expected to not flow out from the expansion tank 29 to the downstream side. That is, while the first flow step is being performed, air bubbles mixed into the first heat medium flowing through the first heat medium flow path 23 can be sufficiently removed in the expansion tank 29. More specifically, when the first heat medium is newly filled into the first heat medium flow path 23, air bubbles may be mixed into the first heat medium, so in order to remove air bubbles from the first heat medium, it is effective to first carry out this first flow step. Note that, as shown in FIG. 8, when the second branched flow path 40 is connected to the upper portion of the expansion tank 29, there is a possibility that the first heat medium that has flowed into the expansion tank 29 through the second branched flow path 40 will collide with the liquid surface of the first heat medium from above, thus newly generating air bubbles.

FIG. 9 shows the flow state performed after the heat medium was caused to flow in the flow state shown in FIG. 8. Here, after performing flow of the heat medium shown in FIG. 8 (the first flow step), the first heat medium is caused to flow through the first heat medium flow path 23 while operating the first pump 32 and adjusting the opening degree of each of the first flow rate adjustment valve F1 and the second flow rate adjustment valve F2 (that is, by setting both the first flow rate adjustment valve F1 and the second flow rate adjustment valve F2 to an open state) to cause a portion of the first heat medium that flows through the first heat medium flow path 23 to the second branching location 39 to reach the expansion tank 29 through the second branched flow path 40, and to cause the first heat medium stored in the expansion tank 29 to reach the first branching location 38 through the first branched flow path 37, and also to cause the remaining portion of the first heat medium to reach the first branching location 38 without passing through the second branched flow path 40 and the first branched flow path 37 (a transition flow step).

When such a transition flow step is performed, flow of the first heat medium in the first heat medium flow path 23 is performed while causing a portion of the first heat medium that flows through the first heat medium flow path 23 to the second branching location 39 to reach the expansion tank 29 through the second branched flow path 40, and causing the first heat medium stored in the expansion tank 29 to reach the first branching location 38 through the first branched flow path 37, and also, causing the remaining portion of the first heat medium to reach the first branching location 38 without passing through the second branched flow path 40 and the first branched flow path 37. That is, during performance of the transition flow step shown in FIG. 9, the flow speed of the first heat medium that flows through all of the first heat medium flow path 23 can be made sufficiently high while reducing the flow speed of the first heat medium that flows through the second branched flow path 40 and the expansion tank 29 in comparison to the flow speed during performance of the first flow step shown in FIG. 8. By reducing the flow speed of the first heat medium that flows through the expansion tank 29, even if the first heat medium that has flowed into the expansion tank 29 collides against the liquid surface within the expansion tank 29 from above, the force of the collision becomes weaker, and the movement of the first heat medium inside the expansion tank 29 also becomes smaller. As a result, generation of new air bubbles on the liquid surface inside the expansion tank 29 can be suppressed, and even if air bubbles are contained in the first heat medium, the air bubbles are easily separated from the first heat medium while being retained inside the expansion tank 29 (that is, the air bubbles can be suppressed from flowing out of the expansion tank 29 while still mixed into the first heat medium). Also, the flow speed of the first heat medium that flows through all of the first heat medium flow path 23 can be made sufficiently high, so air bubbles that may exist in the first heat medium at various locations in the first heat medium flow path 23 are not confined at those locations, and flow together with the first heat medium. Also, it can be expected that the air bubbles ultimately reach the expansion tank 29 and are eliminated from the first heat medium. Therefore, even if air bubbles mixed into the first heat medium are not completely removed by performing the first flow step, removal of air bubbles from the first heat medium can be further promoted by performing the transition flow step.

Also, the transition from the first flow step to the transition flow step can be performed at a timing when the first flow step has been performed for a set period, or at a timing when, for example, an operator has visually determined that there are few air bubbles inside the expansion tank 29, or the like.

FIG. 10 shows the flow state performed after the heat medium was caused to flow in the flow state shown in FIG. 9. Here, after performing flow of the heat medium shown in FIG. 9 (the transition flow step), the first heat medium is caused to flow through the first heat medium flow path 23 while operating the first pump 32 and adjusting the opening degree of each of the first flow rate adjustment valve F1 and the second flow rate adjustment valve F2 (that is, by setting the first flow rate adjustment valve F1 to an open state and setting the second flow rate adjustment valve F2 to a closed state) to cause all of the first heat medium that flows through the first heat medium flow path 23 to the second branching location 39 to reach the first branching location 38 without passing through the second branched flow path 40 and the first branched flow path 37 (a second flow step). Also, by performing the second flow step after performing the first flow step and the transition flow step, the first heat medium can be caused to flow in the first heat medium flow path 23 in a state in which air bubbles have been sufficiently removed from the first heat medium.

Also, the transition from the transition flow step to the second flow step can be performed at a timing when the transition flow step has been performed for a set period, or at a timing when, for example, an operator has visually determined that there are extremely few air bubbles inside the expansion tank 29, or the like.

Seventh Embodiment

In the waste heat recovery device 20 of the seventh embodiment, the form of connection of the expansion tank 29 to the first heat medium flow path 23 differs from the above embodiments. In the following description of the waste heat recovery device 20 of the seventh embodiment, a description of the same configurations as in the above embodiments is omitted.

Figure 11:
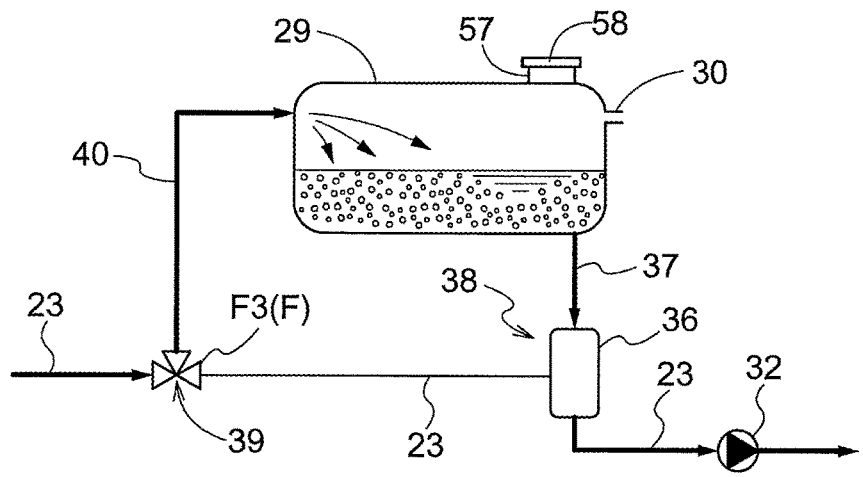
FIG. 11 shows a flow state of the heat medium in the first heat medium flow path and the expansion tank.
Figure 12:
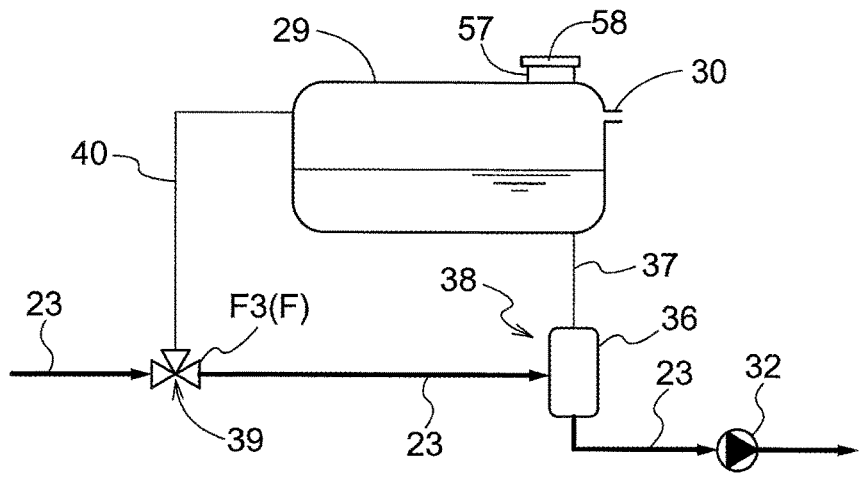
FIG. 12 shows a flow state of the heat medium in the first heat medium flow path and the expansion tank.

FIGS. 11 and 12 show the form of connection of the expansion tank 29 to the first heat medium flow path 23 inside of the waste heat recovery device 20. Also, in FIGS. 11 and 12, a path where the first heat medium flows is depicted by a bold solid line. Note that, although not shown, in the present embodiment as well, a device configuration is assumed in which the expansion tank 29 is provided in the first heat medium flow path 23 between the first heat medium side inlet 21 and the first pump 32, and the first pump 32 is provided in the first heat medium flow path 23 between the first heat medium side inlet 21 and the heat exchanger 28 and the mixer 34. Also, the first heat medium circulates between the waste heat recovery device 20 and the combined heat and power supply device 50.

The waste heat recovery device 20 includes a first branched flow path (branched flow path) 37 that connects a first branching location 38 in the first heat medium flow path 23 to the expansion tank 29, a second branched flow path 40 that connects a second branching location 39 in the first heat medium flow path 23 on the downstream side from the first heat medium side inlet 21 and on the upstream side from the first branching location 38 to the expansion tank 29, and a flow rate adjustment mechanism F capable of adjusting, among the first heat medium that flows to the second branching location 39 through the first heat medium flow path 23, the amount of the first heat medium allowed to reach the expansion tank 29 through the second branched flow path 40. In addition, the air bubble reservoir 36 is provided at the location where the first heat medium flow path 23 and the first branched flow path 37 are connected (the first branching location 38).

In the present embodiment, the flow rate adjustment mechanism F includes a switching valve (a three-way valve) F3 that switches whether to cause the entire amount of the first heat medium that flows through the first heat medium flow path 23 to the second branching location 39 to reach the expansion tank 29 through the second branched flow path 40, or to reach the first branching location 38 through the first heat medium flow path 23 without passing through the second branched flow path 40. The switching valve F3 is a valve whose opening degree is adjusted by a manual operation, a valve whose opening degree is remotely controlled according to control by the control device C, or the like.

Next, an operation method for the waste heat recovery device 20 having such a configuration will be described. This operation method also can be performed when the first heat medium is newly filled or additionally filled into the first heat medium flow path 23, or alternatively, this operation method can be performed, for example, at a timing when it is suspected that air bubbles have mixed into the first heat medium, regardless of whether or not a first cooling medium is newly filled.

FIG. 11 shows the flow state of the first heat medium immediately after injection of the first heat medium from the injection port 57 of the expansion tank 29, or immediately after it is determined that air bubbles are mixed into the first heat medium. At this time, the first heat medium is caused to flow through the first heat medium flow path 23 while operating the first pump 32 and switching the opening/closing state of the switching valve F3 (that is, by the switching valve F3 switching the opening/closing state such that the first heat medium flows only to the side of the second branched flow path 40 from the second branching location 39) to cause the entire amount of the first heat medium that flows through the first heat medium flow path 23 to the second branching location 39 to reach the expansion tank 29 through the second branched flow path 40, and to cause the first heat medium stored in the expansion tank 29 to reach the first branching location 38 through the first branched flow path 37 (a first flow step).

When such a first flow step is performed, flow of the first heat medium in the first heat medium flow path 23 is performed while causing the entire amount of the first heat medium that flows through the first heat medium flow path 23 to the second branching location 39 to reach the expansion tank 29 through the second branched flow path 40. As a result, all of the first heat medium is temporarily retained in the expansion tank 29, so air bubbles mixed into the first heat medium are confined in the expansion tank 29, and can be expected to not flow out from the expansion tank 29 to the downstream side. That is, while the first flow step is being performed, air bubbles mixed into the first heat medium flowing through the first heat medium flow path 23 can be sufficiently removed in the expansion tank 29. More specifically, when the first heat medium is newly filled or additionally filled into the first heat medium flow path 23, air bubbles may be mixed into the first heat medium, so in order to remove air bubbles from the first heat medium, it is effective to first carry out this first flow step.

FIG. 12 shows the flow state performed after the heat medium was caused to flow in the flow state shown in FIG. 11. Here, after performing flow of the heat medium shown in FIG. 11 (the first flow step), the first heat medium is caused to flow through the first heat medium flow path 23 while operating the first pump 32 and switching the state of the switching valve F3 (that is, by the switching valve F3 switching the opening/closing state such that the first heat medium flows only to the side of the first branching location 38 from the second branching location 39) to cause the entire amount of the first heat medium that flows through the first heat medium flow path 23 to the second branching location 39 to reach the first branching location 38 without passing through the second branched flow path 40 and the first branched flow path 37 (a second flow step). Also, by performing the second flow step after performing the first flow step, the first heat medium can be caused to flow in the first heat medium flow path 23 in a state in which air bubbles have been sufficiently removed from the first heat medium.

Also, the transition from the first flow step to the second flow step can be performed at a timing when the first flow step has been performed for a set period, or at a timing when, for example, an operator has visually determined that there are few air bubbles inside the expansion tank 29, or the like.

Other Embodiments

In the above embodiments, the waste heat recovery device 20 and a heat supply system were described using specific examples, but these configurations can be appropriately changed.

For example, although an example in which the heat supply system includes two heat source devices (the combined heat and power supply device 50 and the boiler device 1) is described, the heat supply system may further include another heat source device. In that case, a heat source device additionally provided may be connected to the second heat medium supply path 3 and the second heat medium return path 2 in parallel to the waste heat recovery device 20 and the boiler device 1 described above.

In the above embodiments, the first temperature sensor (the first temperature detection unit) 46, the second temperature sensor (the second temperature detection unit) 45, the room temperature sensor (the room temperature detection unit) 49, and the like may also be realized with a thermostat. For example, the first temperature detection unit, which is a thermostat, is set so as to mechanically switch to an on state when detecting that the temperature of the hot water stored in the tank 17 is the first lower limit temperature or less, and mechanically switch to an off state when detecting that the water temperature is higher than the first lower limit temperature. By adopting such a configuration, the control device C can know that the first temperature detection unit, which is a thermostat, has detected that the temperature of the hot water has become the first lower limit temperature or less. It is also possible to adopt a configuration in which a threshold temperature (for example, such as the above-described first lower limit temperature) where the thermostat switches between the on state and the off state can be changed using a manual dial or the like.

In the above embodiments, the mixer 34 may be configured using an electronically controlled three-way mixing valve with valve opening/closing adjustment controlled according to a temperature detected by a temperature sensor (not shown), for example, or the mixer 34 may be configured using a plurality of such electronically controlled two-way valves.

Figure 13:
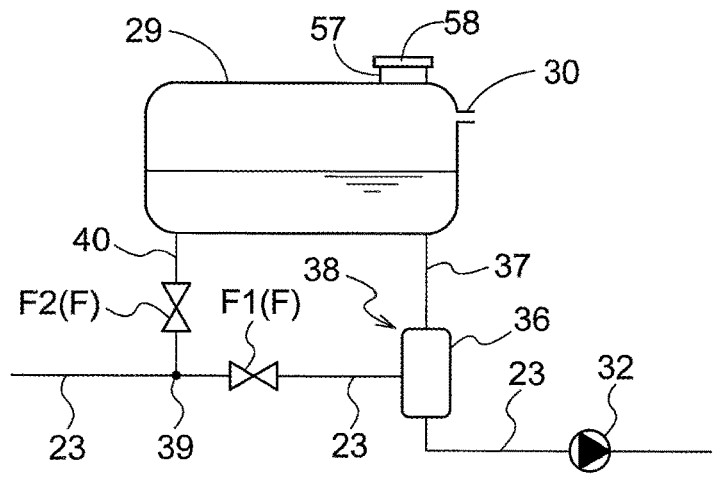
FIG. 13 shows a connection state of the expansion tank to the first heat medium flow path.

FIGS. 8 to 12 show configurations in which the first branched flow path 37 and the second branched flow path 40 branched from the first heat medium flow path 23 are configured to be connected to the expansion tank 29, but for example, the form of connection of the second branched flow path 40 to the expansion tank 29 can be appropriately changed. For example, as shown in FIG. 13, the second branched flow path 40 may be connected to a lower portion of the expansion tank 29.

As shown in FIGS. 8 to 12, when the second branched flow path 40 is connected to the upper portion of the expansion tank 29, there is a possibility that the first heat medium that flows into the expansion tank 29 through the second branched flow path 40 will collide with the liquid surface of the first heat medium from above, thus newly generating air bubbles. However, by adopting the form of connection as shown in FIG. 13, when the first heat medium flows into the lower portion of the expansion tank 29 through the second branched flow path 40, a phenomenon in which this first heat medium collides with the liquid surface of the first heat medium in the expansion tank 29 does not occur. As a result, air bubbles are not newly generated in the expansion tank 29.

In FIG. 6 and FIGS. 8 to 12, the form of connection of the expansion tank 29 to the first heat medium flow path 23 is shown assuming a configuration in which the expansion tank 29 is provided in the first heat medium flow path 23 between the first heat medium side inlet 21 and the first pump 32, and the first pump 32 is provided in the first heat medium flow path 23 between the first heat medium side inlet 21 and the heat exchanger 28 and the mixer 34 (for example, the configuration described with reference to FIG. 5), but the form of connection of the expansion tank 29 to the first heat medium flow path 23 shown in FIG. 6 and FIGS. 8 to 12 can also be adopted in a configuration in which the expansion tank 29 and the first pump 32 are provided at locations as shown in FIGS. 2 and 4.

Note that the configurations disclosed in the above embodiments (including the 'other embodiments', and also applying hereinafter) can be applied in combination with configurations disclosed in another embodiment, as long as there is no contradiction, and furthermore, the embodiments disclosed in the present specification are merely examples, and embodiments of the present invention are not limited to these, and can be appropriately modified within a scope not departing from the object of the present invention.

INDUSTRIAL APPLICABILITY

The present invention can be utilized in a waste heat recovery device that recovers heat of a first heat medium and transfers that heat to a second heat medium, a heat supply system provided with the waste heat recovery device, and an operation method for the waste heat recovery device.

DESCRIPTION OF REFERENCE SIGNS 1 boiler device (second heat source device)
2 second heat medium return path
3 second heat medium supply path
11 first heat medium return path
12 first heat medium supply path
19 heat utilization unit
20 waste heat recovery device
21 first heat medium side inlet
22 first heat medium side outlet
23 first heat medium flow path
24 bypass flow path
25 second heat medium side inlet
26 second heat medium side outlet
27 second heat medium flow path
28 heat exchanger
29 expansion tank
30 opening
32 first pump
34 mixer
35 throttle valve (flow rate adjuster)
37 branched flow path (first branched flow path)
38 first branching location
39 second branching location
40 second branched flow path
43 tube
50 combined heat and power supply device (first heat source device)
F flow rate adjustment mechanism
F1 first flow rate adjustment valve
F2 second flow rate adjustment valve
F3 switching valve
V external container

The invention claimed is:
1. A waste heat recovery device that recovers heat of a first heat medium and transfers that heat to a second heat medium, the waste heat recovery device comprising:
  a first heat medium side inlet where the first heat medium flows in;
  a first heat medium side outlet where the first heat medium flows out;
  a first heat medium flow path where the first heat medium flows from the first heat medium side inlet to the first heat medium side outlet;
  a first pump provided in the first heat medium flow path and causing the first heat medium to flow in the first heat medium flow path;
  a second heat medium side inlet where the second heat medium flows in;
  a second heat medium side outlet where the second heat medium flows out;
  a second heat medium flow path where the second heat medium flows from the second heat medium side inlet to the second heat medium side outlet;
  a heat exchanger that exchanges heat between the first heat medium that flows through the first heat medium flow path and the second heat medium that flows through the second heat medium flow path;
  an expansion tank provided in the first heat medium flow path;
  a bypass flow path that causes the first heat medium to flow so as to bypass the heat exchanger in the first heat medium flow path; and
  a mixer provided at a location where the bypass flow path and the first heat medium flow path merge together, the mixer configured to adjust a ratio of a flow rate of the first heat medium that flows through the bypass flow path and a flow rate of the first heat medium that flows through the heat exchanger, thereby mixing them such that the temperature of the first heat medium after merging approaches a predetermined temperature,
  wherein the first pump is provided in the first heat medium flow path between the first heat medium side inlet and the heat exchanger and the mixer,
  wherein the expansion tank is provided in the first heat medium flow path between the first heat medium side inlet and the first pump, the inside of the expansion tank being open to the atmosphere, and
  wherein the first heat medium that has flowed from the first heat medium side inlet in the first heat medium flow path flows in sequence through the expansion tank, the first pump, and at least the mixer from the heat exchanger and the mixer, and flows out from the first heat medium side outlet.

2. The waste heat recovery device according to claim 1, wherein the expansion tank is configured to be connected to a branched flow path that branches from within the first heat medium flow path.

3. The waste heat recovery device according to claim 1, comprising:
   a first branched flow path configured to connect a first branching location in the first heat medium flow path to the expansion tank;
   a second branched flow path configured to connect a second branching location in the first heat medium flow path on the downstream side from the first heat medium side inlet and on the upstream side from the first branching location to the expansion tank; and
   a flow rate adjustment mechanism capable of adjusting, among the first heat medium that flows to the second branching location through the first heat medium flow path, the amount of the first heat medium allowed to reach the expansion tank through the second branched flow path.

4. The waste heat recovery device according to claim 3, wherein the second branched flow path is connected to a lower portion of the expansion tank.

5. The waste heat recovery device according to claim 3, wherein the flow rate adjustment mechanism includes a switching valve that switches whether to cause the entire amount of the first heat medium that flows through the first heat medium flow path to the second branching location to reach the expansion tank through the second branched flow path, or alternatively, to reach the first branching location through the first heat medium flow path without passing through the second branched flow path.

6. The waste heat recovery device according to claim 3, wherein the flow rate adjustment mechanism includes a first flow rate adjustment valve that is provided in the first heat medium flow path between the second branching location and the first branching location, and can adjust the amount of the first heat medium that flows through the first heat medium flow path, and a second flow rate adjustment valve that is provided in the second branched flow path between the second branching location and the expansion tank, and can adjust the amount of the first heat medium that flows through the second branched flow path.

7. The waste heat recovery device according to claim 1, wherein the expansion tank has an opening configured to be opened to the outside, and
   the waste heat recovery device is provided with a tube configured for one end of the tube to be connected to the opening and the other end of the tube to be opened to the atmosphere,
   the tube having a length such that in a state with one end of the tube connected to the opening, the other end of the tube can be drawn outdoors.

8. The waste heat recovery device according to claim 1, wherein the mixer is a temperature-sensitive mixing valve that senses the temperature of the first heat medium after the merging, and adjusts a ratio of a flow rate of the first heat medium that flows through the bypass flow path and a flow rate of the first heat medium that flows through the heat exchanger, thereby mixing them together, and is configured to be capable of changing the setting of the predetermined temperature.

9. The waste heat recovery device according to claim 1, comprising:
   an external container, the waste heat recovery device having the first heat medium side inlet, the first heat medium side outlet, the second heat medium side inlet, and the second heat medium side outlet on a surface of the external container, and the waste heat recovery device having the first heat medium flow path, the second heat medium flow path, the heat exchanger, the expansion tank, the bypass flow path, and the mixer on the inside of the external container.

10. The waste heat recovery device according to claim 1, comprising:
    a flow rate adjuster provided in the first heat medium flow path between the first pump and the first heat medium side outlet, and configured to adjust the flow rate of the first heat medium that flows out from the first heat medium side outlet.

11. A heat supply system, comprising:
    a second heat medium return path configured such that after a heat utilization unit that utilizes heat being held by the second heat medium has utilized the heat, the second heat medium is returned from the heat utilization unit, the second heat medium return path causing the flow of the second heat medium to be branched at a branching portion in the second heat medium return path;
    a second heat medium supply path configured to supply the second heat medium to the heat utilization unit, the second heat medium supply path causing the second heat medium that flowed in a branched manner to merge at a merging portion in the path;
    the waste heat recovery device according to claim 1, in which the second heat medium return path after branching at the branching portion is connected to the second heat medium side inlet, and the second heat medium supply path is connected to the second heat medium side outlet;
    a first heat source device that heats the first heat medium to be supplied from the waste heat recovery device through a first heat medium supply path configured to be connected to the first heat medium side outlet, and supplies the heated first heat medium to the waste heat recovery device through a first heat medium return path configured to be connected to the first heat medium side inlet; and
    a second heat source device that heats the second heat medium to be supplied through the second heat medium return path after branching at the branching portion, and supplies the heated second heat medium to the second heat medium supply path.

12. An operation method for the waste heat recovery device, the waste heat recovery device comprising:
    a first heat medium side inlet where the first heat medium flows in;
    a first heat medium side outlet where the first heat medium flows out;
    a first heat medium flow path where the first heat medium flows from the first heat medium side inlet to the first heat medium side outlet;
    a first pump provided in the first heat medium flow path and causing the first heat medium to flow in the first heat medium flow path;
    a second heat medium side inlet where the second heat medium flows in;
    a second heat medium side outlet where the second heat medium flows out;

a second heat medium flow path where the second heat medium flows from the second heat medium side inlet to the second heat medium side outlet;

a heat exchanger that exchanges heat between the first heat medium that flows through the first heat medium flow path and the second heat medium that flows through the second heat medium flow path;

an expansion tank provided in the first heat medium flow path;

a bypass flow path that causes the first heat medium to flow so as to bypass the heat exchanger in the first heat medium flow path;

a mixer provided at a location where the bypass flow path and the first heat medium flow path merge together, the mixer configured to adjust a ratio of a flow rate of the first heat medium that flows through the bypass flow path and a flow rate of the first heat medium that flows through the heat exchanger, thereby mixing them such that the temperature of the first heat medium after merging approaches a predetermined temperature;

a first branched flow path configured to connect a first branching location in the first heat medium flow path to the expansion tank;

a second branched flow path configured to connect a second branching location in the first heat medium flow path on the downstream side from the first heat medium side inlet and on the upstream side from the first branching location to the expansion tank; and a flow rate adjustment mechanism capable of adjusting, among the first heat medium that flows to the second branching location through the first heat medium flow path, the amount of the first heat medium allowed to reach the expansion tank through the second branched flow path, the operation method comprising:

performing a first flow step of causing flow of the first heat medium in the first heat medium flow path, while causing the entire amount of the first heat medium that flows through the first heat medium flow path to the second branching location to reach the expansion tank through the second branched flow path and causing the first heat medium stored in the expansion tank to reach the first branching location through the first branched flow path; and after performing the first flow step, performing a second flow step of causing flow of the first heat medium in the first heat medium flow path, while causing the entire amount of the first heat medium that flows through the first heat medium flow path to the second branching location to reach the first branching location without passing through the second branched flow path and the first branched flow path.

13. An operation method for the waste heat recovery device, the waste heat recovery device comprising:

a first heat medium side inlet where the first heat medium flows in;

a first heat medium side outlet where the first heat medium flows out;

a first heat medium flow path where the first heat medium flows from the first heat medium side inlet to the first heat medium side outlet;

a first pump provided in the first heat medium flow path and causing the first heat medium to flow in the first heat medium flow path;

a second heat medium side inlet where the second heat medium flows in;

a second heat medium side outlet where the second heat medium flows out;

a second heat medium flow path where the second heat medium flows from the second heat medium side inlet to the second heat medium side outlet;

a heat exchanger that exchanges heat between the first heat medium that flows through the first heat medium flow path and the second heat medium that flows through the second heat medium flow path;

an expansion tank provided in the first heat medium flow path;

a bypass flow path that causes the first heat medium to flow so as to bypass the heat exchanger in the first heat medium flow path;

a mixer provided at a location where the bypass flow path and the first heat medium flow path merge together, the mixer configured to adjust a ratio of a flow rate of the first heat medium that flows through the bypass flow path and a flow rate of the first heat medium that flows through the heat exchanger, thereby mixing them such that the temperature of the first heat medium after merging approaches a predetermined temperature;

a first branched flow path configured to connect a first branching location in the first heat medium flow path to the expansion tank;

a second branched flow path configured to connect a second branching location in the first heat medium flow path on the downstream side from the first heat medium side inlet and on the upstream side from the first branching location to the expansion tank; and a flow rate adjustment mechanism capable of adjusting, among the first heat medium that flows to the second branching location through the first heat medium flow path, the amount of the first heat medium allowed to reach the expansion tank through the second branched flow path, the operation method comprising:

performing a first flow step of causing flow of the first heat medium in the first heat medium flow path, while causing the entire amount of the first heat medium that flows through the first heat medium flow path to the second branching location to reach the expansion tank through the second branched flow path and causing the first heat medium stored in the expansion tank to reach the first branching location through the first branched flow path;

after performing the first flow step, performing a transition flow step of causing flow of the first heat medium in the first heat medium flow path, while causing a portion of the first heat medium that flows through the first heat medium flow path to the second branching location to reach the expansion tank through the second branched flow path and causing the first heat medium stored in the expansion tank to reach the first branching location through the first branched flow path, and also while causing a remaining portion of the first heat medium to reach the first branching location without passing through the second branched flow path and the first branched flow path; and after performing the transition flow step, performing a second flow step of causing flow of the first heat medium in the first heat medium flow path, while causing the entire amount of the first heat medium that flows through the first heat medium flow path to the second branching location to reach the first branching location without passing through the second branched flow path and the first branched flow path.

* * * * *